(12) United States Patent
Matsui et al.

(10) Patent No.: US 8,369,969 B2
(45) Date of Patent: Feb. 5, 2013

(54) DISTRIBUTED SIGNIFICANT CONTROL MONITORING SYSTEM AND DEVICE WITH TRANSMISSION SYNCHRONIZATION

(75) Inventors: Toshinori Matsui, Tokyo (JP); Kiyohiro Morita, Tokyo (JP); Madoka Baba, Tokyo (JP); Toru Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 382 days.

(21) Appl. No.: 12/813,102

(22) Filed: Jun. 10, 2010

(65) Prior Publication Data

US 2010/0318197 A1 Dec. 16, 2010

(30) Foreign Application Priority Data

Jun. 11, 2009 (JP) ................................. 2009-139867
Oct. 12, 2009 (JP) ................................. 2009-236402

(51) Int. Cl.
*G05B 9/02* (2006.01)

(52) U.S. Cl. ............... 700/82; 700/12; 700/79; 180/271

(58) Field of Classification Search .................... 700/11, 700/12, 79, 82; 702/58, 59; 180/271
See application file for complete search history.

(56) References Cited

U.S. PATENT DOCUMENTS

| | | | | |
|---|---|---|---|---|
| 4,634,110 | A * | 1/1987 | Julich et al. | 714/11 |
| 6,913,106 | B2 * | 7/2005 | Katou et al. | 180/402 |
| 7,801,702 | B2 * | 9/2010 | Berbaum et al. | 702/185 |
| 7,996,732 | B2 * | 8/2011 | Nishimura | 714/55 |
| 2004/0011579 | A1 | 1/2004 | Heckmann et al. | |

FOREIGN PATENT DOCUMENTS

| | | |
|---|---|---|
| DE | 10211278 A1 | 10/2002 |
| JP | 02-246841 A | 10/1990 |
| JP | 4-295955 A | 10/1992 |
| JP | 3729893 A | 12/1996 |
| JP | 4140529 B2 | 6/2008 |

OTHER PUBLICATIONS

Watchdog Timer, Wikipedia-Artiket, Watchdog, Jan. 31, 2009.

* cited by examiner

*Primary Examiner* — Dave Robertson
(74) *Attorney, Agent, or Firm* — Sughrue Mion, PLLC

(57) ABSTRACT

Provided is a control system capable of reducing cost while securing reliability of original processing of a microcomputer. An engine control device and a meter control device each store a control amount calculating procedure for calculating a control amount regarding a significant control to be performed on the control target of the engine control device. The engine control device compares a control amount regarding the significant control calculated by the engine control device, and a control amount regarding the significant control calculated by the meter control device, to thereby control the control target of the engine control device based on a result of the comparison.

32 Claims, 17 Drawing Sheets

DISTRIBUTED SIGNIFICANT CONTROL MONITORING SYSTEM AND DEVICE WITH TRANSMISSION SYNCHRONIZATION

BACKGROUND OF THE INVENTION

1. Field of the Invention

The present invention relates to a control system including a plurality of control devices for controlling different subjects, respectively, the plurality of control devices each being connected to a network in which availability of transmission is determined based on a communication status at a time of the transmission, and a control system including a plurality of control devices for controlling different subjects, respectively, the plurality of control devices each being connected to a network in which time synchronization is possible between nodes connected thereto.

2. Description of the Related Art

Conventionally, as a control device having high reliability, there has been known such a control device as illustrated in FIG. 16. In FIG. 16, in order to enhance the reliability of control, the control device uses two identical microcomputers, and executes the control with so-called multiplexed microcomputers. In the control device, identical pieces of data are input to each of the microcomputers, and, by comparing pieces of data which are output as results of calculations with each other, abnormality detection is performed to enhance the reliability of the control.

However, the above-mentioned control device with the multiplexed microcomputers requires two microcomputers having the same function for the abnormality detection, and hence, there is a problem in that a circuit size thereof becomes larger, resulting in increased cost.

In view of the above, in order to solve the above-mentioned problem, such a control device as illustrated in FIG. 17 is proposed. In FIG. 17, the control device includes a microcomputer and a monitoring circuit specialized for a monitoring function. Apart from the original calculation processing function of the microcomputer, the microcomputer is provided with a calculation processing function for the abnormality detection. The monitoring circuit is provided with a calculation circuit section for executing calculation instructions necessary for implementing the calculation processing of the microcomputer for the abnormality detection (for example, see JP 3729893 B).

This control device causes the microcomputer and the monitoring circuit to execute identical calculation processing based on identical setting data, and, by comparing pieces of data output as results of calculations, the abnormality detection is performed based on a difference between the results. With this configuration, without using two microcomputers having the same function, the abnormality detection can be performed with a smaller circuit size and at lower cost.

However, the related art has the following problems.

The control device disclosed in JP 3729893 B has a problem in that because it is necessary to provide, outside the microcomputer, the monitoring circuit capable of performing the calculation processing for the abnormality detection with calculation power comparable to that of the microcomputer, the cost becomes higher even though the cost is lower compared to the case where two microcomputers having the same function are used.

In addition, an abnormality is detected through the calculation processing for the abnormality detection, which is different from the original calculation processing that is to be carried out by the microcomputer. Accordingly, it is possible to perform the abnormality detection for the microcomputer itself, but it is impossible to perform the abnormality detection when the microcomputer is executing the original processing of the microcomputer. Hence, the control device also has a problem that the reliability of the original processing may not be secured.

SUMMARY OF THE INVENTION

In order to solve the above-mentioned problems, the present invention has been made, and has an object to provide a control system capable of reducing cost while securing reliability of original processing of a microcomputer.

A control system according to the present invention includes a plurality of control devices for controlling different control targets, respectively, the plurality of control devices each being connected to a network in which availability of transmission is determined based on a communication status at a time of the transmission. The plurality of control devices includes a first control device and a second control device and subsequent control devices. The first control device and at least one of the second control device and the subsequent control devices each store a control amount calculating procedure for calculating a control amount regarding a significant control having a higher degree of significance among controls to be performed on the control target of the first control device. The first control device compares a control amount regarding the significant control, which is calculated by the first control device, and a control amount regarding the significant control, which is calculated by the at least one of the second control device and the subsequent control devices, to thereby control the control target of the first control device based on a result of the comparison. When data regarding the significant control is transmitted and received between the first control device and the at least one of the second control device and the subsequent control devices, a control device that is to transmit the data regarding the significant control transmits the data regarding the significant control after suspending the transmission of data from other control devices.

Further, a control system according to the present invention includes a plurality of control devices for controlling different control targets, respectively, the plurality of control devices each being connected to a network in which time synchronization is possible between nodes connected thereto. The plurality of control devices includes a first control device and a second control device and subsequent control devices. The first control device and the second control device and the subsequent control devices each store a control amount calculating procedure for calculating a control amount regarding a significant control having a higher degree of significance among controls to be performed on the control target of the first control device. The first control device compares a control amount regarding the significant control, which is calculated by the first control device, and a control amount regarding the significant control, which is calculated, after synchronization with the first control device, by one of the second control device and the subsequent control devices, to thereby control the control target of the first control device based on a result of the comparison.

In the control system according to the present invention, the first control device and the second control device and the subsequent control devices are each connected to the network in which the availability of the transmission is determined based on the communication status at the time of the transmission. The first control device and the at least one of the second control device and the subsequent control devices each store the control amount calculating procedure for calculating the control amount regarding the significant control having a higher degree of significance among the controls to be performed on the control target of the first control device. The first control device compares the control amount regarding the significant control, which is calculated by the first control device, and the control amount regarding the significant control, which is calculated by the at least one of the second control device and the subsequent control devices, to thereby control the control target of the first control device based on a result of the comparison. When the data regarding the significant control is transmitted and received between the first control device and the at least one of the second control device and the subsequent control devices, the control device that is to transmit the data regarding the significant control transmits the data regarding the significant control after suspending the transmission of the data from the other control devices.

Therefore, without providing two microcomputers having the same function or the monitoring circuit within the control device and without being affected by the network communication status at the time of the transmission, by comparing and examining the control amount regarding the significant control, which is calculated by the first control device, and the control amount regarding the significant control, which is calculated by the at least one of the second control device and the subsequent control devices, it is possible to obtain the control system capable of reducing the cost while securing the reliability of the original processing of the microcomputer.

Further, in the control system according to the present invention, the first control device and the second control device and the subsequent control devices are each connected to the network in which the time synchronization is possible between the nodes connected thereto. The first control device and the second control device and the subsequent control devices each store the control amount calculating procedure for calculating the control amount regarding the significant control having the higher degree of significance among the controls to be performed on the control target of the first control device. The first control device compares the control amount regarding the significant control, which is calculated by the first control device, and the control amount regarding the significant control, which is calculated, after the synchronization with the first control device, by the one of the second control device and the subsequent control devices, to thereby control the control target of the first control device based on the result of the comparison.

In other words, without providing two microcomputers having the same function or the monitoring circuit within the control device, by comparing and examining the control amount regarding the significant control, which is calculated by the first control device, and the control amount regarding the significant control, which is calculated by the one of the second control device and the subsequent control devices, it is possible to obtain the control system capable of reducing the cost while securing the reliability of the control.

DETAILED DESCRIPTION OF THE PREFERRED EMBODIMENTS

Figure 1:
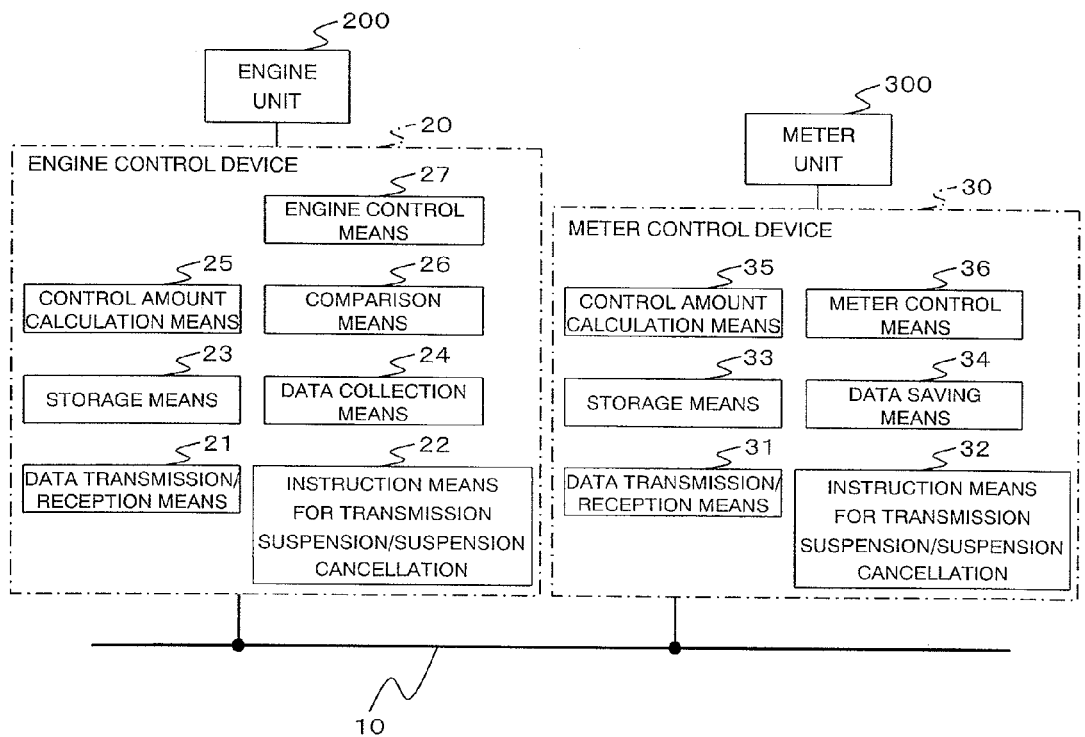
FIG. 1 is a block configuration diagram illustrating a control system according to a first embodiment of the present invention.

Hereinbelow, with reference to the drawings, description is given of preferred embodiments of a control system according to the present invention. In the drawings, like reference numerals and symbols refer to identical or corresponding elements.

Here, in the following embodiments, description is given of a case where the control system is mounted on a vehicle.

First Embodiment

FIG. 1 is a block configuration diagram illustrating a control system according to a first embodiment of the present invention.

In FIG. 1, the control system includes a vehicle-mounted network 10 (hereinbelow, referred to as "network 10"), an engine control device 20 (first control device) connected to the network 10, and a meter control device 30 (second control device). Further, the engine control device 20 and the meter control device 30 are connected to an engine unit 200 and a meter unit 300, respectively, which are control targets.

Here, as the network 10, there is employed a CAN network for performing communication (hereinbelow, referred to as "CAN communication") compliant with a controller area network (CAN) protocol (international standard ISO 11898), which adopts a carrier sense multiple access/collision avoidance (CSMA/CA) scheme as a method for connecting to a network.

In the CAN network, when linked nodes are not in communication, all nodes can start transmissions, and if the transmissions have occurred simultaneously, arbitration is conducted based on priorities of transmission data. In other words, the CAN network is a network in which availability of transmission is determined based on a communication status at the time of the transmission. Incidentally, CAN communication is a well-known technology, and hence detailed description thereof is omitted.

It should be noted that the network is not limited to the network described above, and another network may be used as long as the network uses a protocol that adopts the CSMA/CA scheme or a scheme similar thereto as a method for connecting to the network.

Next, description is given of a configuration and functions of the engine control device 20.

The engine control device 20 includes data transmission/reception means 21, instruction means for transmission suspension/suspension cancellation 22 (first instruction means for transmission suspension/suspension cancellation), storage means 23 (first storage means), data collection means 24, control amount calculation means 25 (first control amount calculation means), comparison means 26, and engine control means 27 (control means). Further, the control amount calculation means 25 is configured by a microcomputer.

Further, apart from the above-mentioned means, the engine control device 20 includes other necessary components. However, those components do not have direct relevance to the first embodiment, and hence description thereof is omitted.

The data transmission/reception means 21 transmits and receives data to and from, via the network 10, other control devices (including the meter control device 30) connected to the network 10. The instruction means for transmission suspension/suspension cancellation 22 transmits, via the network 10, an instruction to suspend data transmission or an instruction to cancel suspension of data transmission to all the other control devices (including the meter control device 30) connected to the network 10. The storage means 23 stores various pieces of data, which are described below.

The data collection means 24 collects data necessary for engine control (data for first control). The control amount calculation means 25 calculates a control amount necessary for the engine control according to a processing procedure described below. The comparison means 26 compares the control amount calculated by the control amount calculation means 25 with a control amount received from the other control devices (including the meter control device 30) connected to the network 10. The engine control means 27 executes control of the engine unit 200 based on the calculated control amount.

Figure 2:
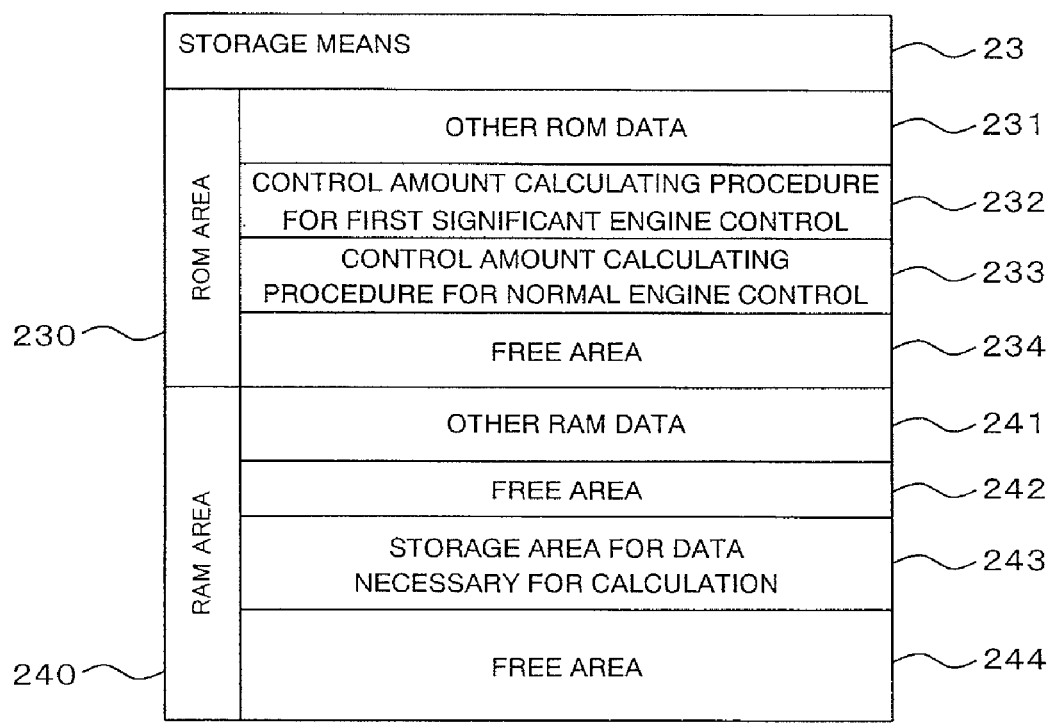
FIG. 2 is an explanatory diagram illustrating in detail storage means of an engine control device of FIG. 1.

Next, referring to FIG. 2, detailed description is given of the storage means 23 of the engine control device 20.

In FIG. 2, the storage means 23 is divided into a ROM area 230 in which no other data can be stored apart from previously-stored data and a RAM area 240 in which data can be stored.

The ROM area 230 contains other ROM data 231, a control amount calculating procedure for first significant engine control (first significant control) 232 (first control amount calculating procedure), a control amount calculating procedure for normal engine control 233, and a free area 234.

Here, the other ROM data 231 and the free area 234 have no direct relevance to the first embodiment, and hence description thereof is omitted.

The control amount calculating procedure for first significant engine control 232 indicates a procedure for calculating a control amount regarding the first significant engine control, whereas the control amount calculating procedure for normal engine control 233 indicates a procedure for calculating a control amount regarding the normal engine control.

Here, the first significant engine control refers to such control that may endanger the vehicle, the driver, the surroundings of the vehicle, etc. depending on a calculation result, and therefore refers to such control that requires high reliability.

Further, the RAM area 240 contains other RAM data 241, a free area 242, a storage area for data necessary for calculation 243, and a free area 244.

Here, the other RAM data 241, the free area 242, and the free area 244 have no direct relevance to the first embodiment, and hence description thereof is omitted.

The storage area for data necessary for calculation 243 is an area in which data necessary for calculating a control amount regarding the first significant engine control is stored.

Next, referring back to FIG. 1, description is given of a configuration and functions of the meter control device 30.

The meter control device 30 includes data transmission/reception means 31, instruction means for transmission suspension/suspension cancellation 32 (second instruction means for transmission suspension/suspension cancellation), storage means 33 (second storage means), data saving means 34, control amount calculation means 35 (second control amount calculation means), and meter control means 36. Further, the control amount calculation means 35 is configured by a microcomputer.

Further, apart from the above-mentioned means, the meter control device 30 includes other necessary components. However, those components do not have direct relevance to the first embodiment, and hence description thereof is omitted.

The data transmission/reception means 31 transmits and receives data to and from, via the network 10, other control devices (including the engine control device 20) connected to the network 10. The instruction means for transmission suspension/suspension cancellation 32 transmits, via the network 10, an instruction to suspend data transmission or an instruction to cancel suspension of data transmission to all the other control devices (including the engine control device 20) connected to the network 10. The storage means 33 stores various pieces of data, which are described below.

The data saving means 34 causes the storage means 33 to store the data necessary for calculating the control amount regarding the first significant engine control, which is received from the engine control device 20. The control amount calculation means 35 calculates a control amount necessary for the meter control and the engine control according to a processing procedure described below. The meter control means 36 executes control of the meter unit 300 based on the calculated control amount.

Figure 3:
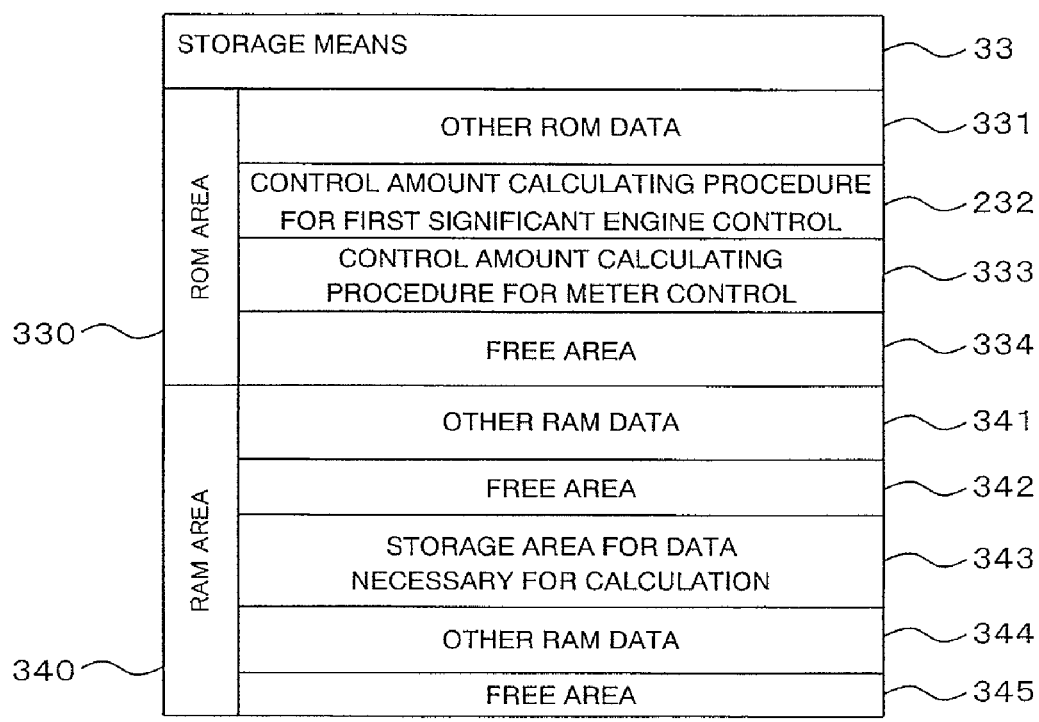
FIG. 3 is an explanatory diagram illustrating in detail storage means of a meter control device of FIG. 1.

Next, referring to FIG. 3, detailed description is given of the storage means 33 of the meter control device 30.

In FIG. 3, the storage means 33 is divided into a ROM area 330 in which no other data can be stored apart from previously-stored data and a RAM area 340 in which data can be stored.

The ROM area 330 contains other ROM data 331, a control amount calculating procedure for first significant engine control 332, a control amount calculating procedure for meter control 333, and a free area 334.

Here, the other ROM data 331 and the free area 334 have no direct relevance to the first embodiment, and hence description thereof is omitted.

The control amount calculating procedure for first significant engine control 232 indicates a procedure for calculating a control amount regarding the first significant engine control. The storage means 23 and the storage means 33 each store the same control amount calculating procedure for first significant engine control. The control amount calculating procedure for meter control 333 indicates a procedure for calculating a control amount regarding the meter control.

Further, the RAM area 340 contains other RAM data 341, a free area 342, a storage area for data necessary for calculation 343, other RAM data 344, and a free area 345.

Here, the other RAM data 341, the free area 342, the other RAM data 344, and the free area 345 have no direct relevance to the first embodiment, and hence description thereof is omitted.

The storage area for data necessary for calculation 343 is an area in which data necessary for calculating a control amount regarding the first significant engine control is stored.

It should be noted that, in FIG. 1, the data transmission/reception means 21 and the data transmission/reception means 31 may be identical to each other. Similarly, in FIG. 1, the instruction means for transmission suspension/suspension cancellation 22 and the instruction means for transmission suspension/suspension cancellation 32 may be identical to each other.

Hereinbelow, referring to a timing chart of FIG. 4, description is given of operation of the control system according to the first embodiment of the present invention. Here, description is given of processing related to the first significant engine control.

Figure 4:
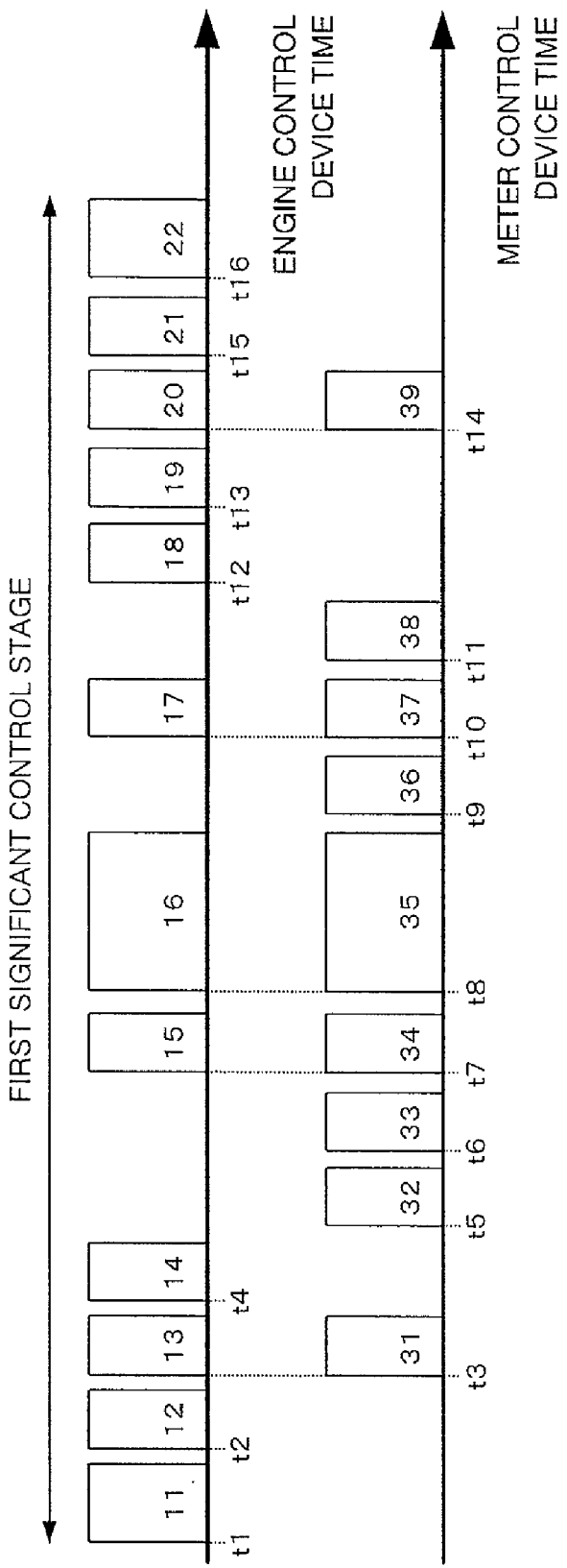
FIG. 4 is a timing chart illustrating an operation of the control system according the first embodiment of the present invention.

In FIG. 4, the horizontal axes represent engine control device time, which indicates the flow of time in the engine control device 20, and meter control device time, which indicates the flow of time in the meter control device 30.

Further, in FIG. 4, the engine control device 20 executes processing of from processing 11 to processing 22. Further, the meter control device 30 executes processing of from processing 31 to processing 39.

Here, the overall processing of from the processing 11 to the processing 22 and from the processing 31 to the processing 39 is processing of a first significant control stage.

It should be noted that the processing of the first significant control stage is repeatedly executed every time the processing related to the first significant engine control is performed.

Next, description is given of the processing of from the processing 11 to the processing 22 performed by the engine control device 20.

In the processing 11, the data collection means 24 collects data necessary for calculating a control amount regarding the first significant engine control, and then causes the storage means 23 to store the collected data in the storage area for data necessary for calculation 243.

In the processing 12, the instruction means for transmission suspension/suspension cancellation 22 transmits, via the network 10, an instruction to suspend data transmission (hereinbelow, referred to as "transmission suspending instruction") to all the other control devices connected to the network 10.

In the processing 13, the data transmission/reception means 21 suspends the transmission of data irrelevant to the first significant engine control according to the transmission suspending instruction transmitted from the instruction means for transmission suspension/suspension cancellation 22.

In the processing 14, the data transmission/reception means 21 transmits, to the meter control device 30, the data necessary for calculating a control amount regarding the first significant engine control.

In the processing 15, the data transmission/reception means 21 resumes the transmission of data irrelevant to the first significant engine control according to an instruction to cancel the suspension of data transmission (hereinbelow, referred to as "suspension canceling instruction"), which is received via the network 10 from the instruction means for transmission suspension/suspension cancellation 32.

In the processing 16, the control amount calculation means 25 calculates the control amount regarding the first significant engine control based on the data necessary for calculating the control amount regarding the first significant engine control and the control amount calculating procedure for first significant engine control 232, which are stored in the storage means 23.

In the processing 17, the data transmission/reception means 21 suspends the transmission of data irrelevant to the first significant engine control according to the transmission suspending instruction received via the network 10 from the instruction means for transmission suspension/suspension cancellation 32.

In the processing 18, the data transmission/reception means 21 receives a control amount regarding the first significant engine control, which is transmitted from the meter control device 30.

In the processing 19, the instruction means for transmission suspension/suspension cancellation 22 transmits, via the network 10, the suspension canceling instruction to all the other control devices connected to the network 10.

In the processing 20, the data transmission/reception means 21 resumes the transmission of data irrelevant to the first significant engine control according to the suspension canceling instruction transmitted from the instruction means for transmission suspension/suspension cancellation 22.

In the processing 21, the comparison means 26 compares the control amount regarding the first significant engine control, which is calculated in the processing 16, and the control amount regarding the first significant engine control, which is received in the processing 18. Then, when the two control amounts have the same value, the comparison means 26 outputs the control amount regarding the first significant engine control to the engine control means 27. When the two control amounts have different values, the comparison means 26 outputs to the engine control means 27 a notification indicating that the control amounts are different.

In the processing 22, the engine control means 27 executes control of the engine unit 200 based on a result of the comparison made by the comparison means 26. Specifically, when the control amount regarding the first significant engine control has been input from the comparison means 26, the engine control means 27 executes the control of the engine unit 200 based on this control amount. When the notification indicating that the control amounts are different has been input from the comparison means 26, the engine control means 27 does not execute the control of the engine unit 200.

Next, description is given of the processing of from the processing 31 to the processing 39 performed by the meter control device 30.

In the processing 31, the data transmission/reception means 31 suspends the transmission of data irrelevant to the first significant engine control according to the transmission suspending instruction received via the network 10 from the instruction means for transmission suspension/suspension cancellation 22.

In the processing 32, the data transmission/reception means 31 receives the data necessary for calculating the control amount regarding the first significant engine control, which is transmitted from the engine control device 20. Then, the data saving means 34 causes the storage means 33 to store the received data in the storage area for data necessary for calculation 343.

In the processing 33, the instruction means for transmission suspension/suspension cancellation 32 transmits, via the network 10, the suspension canceling instruction to all the other control devices connected to the network 10.

In the processing 34, the data transmission/reception means 31 resumes the transmission of data irrelevant to the first significant engine control according to the suspension canceling instruction transmitted from the instruction means for transmission suspension/suspension cancellation 32.

In the processing 35, the control amount calculation means 35 calculates the control amount regarding the first significant engine control based on the data necessary for calculating the control amount regarding the first significant engine control, and the control amount calculating procedure for first significant engine control 232, which are stored in the storage means 33.

In the processing 36, the instruction means for transmission suspension/suspension cancellation 32 transmits, via the network 10, the transmission suspending instruction to all the other control devices connected to the network 10.

In the processing 37, the data transmission/reception means 31 suspends the transmission of data irrelevant to the first significant engine control according to the transmission suspending instruction transmitted from the instruction means for transmission suspension/suspension cancellation 32.

In the processing 38, the data transmission/reception means 31 transmits, to the engine control device 20, the control amount regarding the first significant engine control, which is calculated in the processing 35.

In the processing 39, the data transmission/reception means 31 resumes the transmission of data irrelevant to the first significant engine control according to the suspension canceling instruction received via the network 10 from the instruction means for transmission suspension/suspension cancellation 22.

Here, the processing 16 of the engine control device 20 and the processing 35 of the meter control device 30 are started at a timing when a predetermined period of time has elapsed after reception of the suspension canceling instructions in the processing and the processing 34, respectively. In this manner, by synchronizing the timings with each other, it is possible to execute the processing 16 and the processing 35 at the same timing.

In the timing chart illustrated in FIG. 4, only the processing related to the first significant engine control is illustrated for the purpose of clarifying the features of the first embodiment. However, in actuality, not only this processing, there exist processing related to the normal engine control and processing related to the meter control in the engine control device 20 and in the meter control device 30, respectively. These processings are executed in each of the control devices during the time in which the processing related to the first significant engine control is not executed.

Next, referring to the timing chart of FIG. 4, description is given of operation of the control system, which is performed in a case where there is no abnormality in both of the control amount calculation means 25 and the control amount calculation means 35, enabling the control amounts regarding the first significant engine control to be calculated accurately.

First, at a time point t1, the data collection means 24 executes the processing 11 to cause the storage means 23 to store the data necessary for calculating the control amount regarding the first significant engine control in the storage area for data necessary for calculation 243.

Next, at a time point t2, the instruction means for transmission suspension/suspension cancellation 22 executes the processing 12 to transmit, via the network 10, the transmission suspending instruction to all the other control devices connected to the network 10.

Next, at a time point t3, the data transmission/reception means 21 and the data transmission/reception means 31 simultaneously execute the processing 13 and the processing 31, respectively, to suspend the transmission of data irrelevant to the first significant engine control according to the transmission suspending instruction transmitted from the instruction means for transmission suspension/suspension cancellation 22.

Next, at a time point t4, the data transmission/reception means 21 executes the processing 14 to transmit, via the network 10, the data necessary for calculating the control amount regarding the first significant engine control to the meter control device 30.

Next, at a time point t5, the data transmission/reception means 31 and the data saving means 34 execute the processing 32 to cause the storage means 33 to store, in the storage area for data necessary for calculation 343, the received data necessary for calculating the control amount regarding the first significant engine control.

Next, at a time point t6, the instruction means for transmission suspension/suspension cancellation 32 executes the processing 33 to transmit, via the network 10, the suspension canceling instruction to all the other control devices connected to the network 10.

Next, at a time point t7, the data transmission/reception means 21 and the data transmission/reception means 31 simultaneously execute the processing 15 and the processing 34, respectively, to resume the transmission of data irrelevant to the first significant engine control according to the suspension canceling instruction transmitted from the instruction means for transmission suspension/suspension cancellation 32.

Next, at a time point t8, by using the above-mentioned method of synchronizing the timings with each other, the control amount calculation means 25 and the control amount calculation means 35 simultaneously execute the processing 16 and the processing 35, respectively. The control amount calculation means 25 and the control amount calculation means 35 calculate control amounts regarding the first significant engine control based on the control amount calculating procedure for first significant engine control 232 and the respective pieces of data necessary for calculating the control amount regarding the first significant engine control, which are stored in the storage means 23 and the storage means 33.

Next, at a time point t9, the instruction means for transmission suspension/suspension cancellation 32 executes the processing 36 to transmit, via the network 10, the transmission suspending instruction to all the other control devices connected to the network 10.

Next, at a time point t10, the data transmission/reception means 21 and the data transmission/reception means 31 simultaneously execute the processing 17 and the processing 37, respectively, to suspend the transmission of data irrelevant to the first significant engine control according to the transmission suspending instruction transmitted from the instruction means for transmission suspension/suspension cancellation 32.

Next, at a time point t11, the data transmission/reception means 31 executes the processing 38 to transmit the control amount regarding the first significant engine control, which is calculated in the processing 35, to the engine control device 20 via the network 10.

Next, at a time point t12, the data transmission/reception means 21 executes the processing 18 to receive the control amount regarding the first significant engine control, which is transmitted via the network 10 from the meter control device 30.

Next, at a time point t13, the instruction means for transmission suspension/suspension cancellation 22 executes the processing 19 to transmit, via the network 10, the suspension canceling instruction to all the other control devices connected to the network 10.

Next, at a time point t14, the data transmission/reception means 21 and the data transmission/reception means 31 simultaneously execute the processing 20 and the processing 39, respectively, to resume the transmission of data irrelevant to the first significant engine control according to the suspension canceling instruction transmitted from the instruction means for transmission suspension/suspension cancellation 22.

Next, at a time point t15, the comparison means 26 executes the processing 21 to compare the control amount regarding the first significant engine control, which is calculated in the processing 16, and the control amount regarding the first significant engine control, which is received in the processing 18. Here, because there is no abnormality in both of the control amount calculation means 25 and the control amount calculation means 35, the control amounts regarding the first significant engine control have the same value. Accordingly, the comparison means 26 outputs the control amount regarding the first significant engine control to the engine control means 27.

Next, at a time point t16, the engine control means 27 executes the processing 22 to execute the control of the engine unit 200 based on the control amount regarding the first significant engine control, which has been input from the comparison means 26.

Next, referring to the timing chart of FIG. 4, description is given of operation of the control system, which is performed in a case where there is an abnormality in any one of the control amount calculation means 25 and the control amount calculation means 35.

It should be noted that because the processing from the time point t1 to the time point t7 of the first significant control stage is the same as the above-mentioned processing performed in a case where there is no abnormality in the control amount calculation means 25 and the control amount calculation means 35, description thereof is omitted.

First, at the time point t8, the control amount calculation means 25 and the control amount calculation means 35 simultaneously execute the processing 16 and the processing 35, respectively. The control amount calculation means 25 calculates the control amount regarding the first significant engine control based on the data necessary for calculating the control amount regarding the first significant engine control and the control amount calculating procedure for first significant engine control 232, which are stored in the storage means 23. Here, for example, if there is an abnormality in the control amount calculation means 25, the calculated control amount regarding the first significant engine control has a different value from the control amount that is to be obtained originally.

On the other hand, the control amount calculation means 35 calculates the control amount regarding the first significant engine control based on the data necessary for calculating the control amount regarding the first significant engine control and the control amount calculating procedure for first significant engine control 232, which are stored in the storage means 33.

Further, the processing from the time point t9 to the time point t14 of the first significant control stage is also the same as the above-mentioned processing performed in a case where there is no abnormality in the control amount calculation means 25 and the control amount calculation means 35, and hence description thereof is omitted.

Next, at the time point t15, the comparison means 26 executes the processing 21 to compare the control amount regarding the first significant engine control, which is calculated in the processing 16, and the control amount regarding the first significant engine control, which is received in the processing 18. Here, because there is an abnormality in the control amount calculation means 25, the control amounts regarding the first significant engine control have different values. Accordingly, the comparison means 26 outputs to the engine control means 27 the notification indicating that the control amounts are different.

Next, at the time point t16, the engine control means 27 executes the processing 22. However, due to input of the notification indicating that the control amounts are different from the comparison means 26, the engine control means 27 does not execute the control of the engine unit 200.

In this manner, by comparing and examining is made between the control amount regarding the first significant engine control, which is calculated by the control amount calculation means 25, and the control amount regarding the first significant engine control, which is calculated by the control amount calculation means 35, it is possible to detect whether or not there is an abnormality in any one of the control amount calculation means 25 and the control amount calculation means 35.

Specifically, by comparing the control amount regarding the first significant engine control, which is calculated by the control amount calculation means 25, and the control amount regarding the first significant engine control, which is calculated by the control amount calculation means 35, and, when the two control amounts have the same value, executing the control of the engine unit 200 based on that control amount regarding the first significant engine control, it is possible to reduce the cost of the control system while securing reliability of the control without providing two microcomputers or a monitoring circuit within the engine control device 20 and without being affected by the network communication status at the time of transmission.

Further, while the control amount regarding the first significant engine control is being calculated in the engine control device 20 (original calculation), the corresponding control amount is calculated by the control amount calculation means 35 of the meter control device 30, to thereby compare results of the calculations. Then, when both of the control amounts have the same value, the control of the engine unit 200 is executed based on the control amounts regarding the first significant engine control. As a result, at the time of carrying out not the calculation for the abnormality detection but the original calculation, it is possible to judge whether or not there is an abnormality, thereby securing the reliability of the control.

In addition, while the control amount regarding the first significant engine control is being calculated in the engine control device 20, the corresponding control amount is simultaneously calculated by the control amount calculation means 35 of the meter control device 30. Consequently, comparison between the calculation results can be made as soon as possible, and hence it is also possible to reduce a processing time required for the first significant engine control.

As described above, according to the first embodiment, there are provided a first control device and a second control device, which are connected to a network in which availability of transmission is determined based on a communication status at the time of the transmission. The first control device includes: a first control amount calculation means for calculating a control amount regarding a first significant control based on a first control amount calculating procedure for calculating the control amount regarding the first significant control, and data for first control necessary for calculating the control amount regarding the first significant control for the control target of the first control device; comparison means for comparing the control amount regarding the first significant control, which is calculated by the first control amount calculation means, and the control amount regarding the first significant control, which is calculated by the second control device; control means for controlling the control target based on a result of the comparison made by the comparison means; and a first instruction means for transmission suspension/suspension cancellation for transmitting, to all the other control devices connected to the network, one of a transmission suspending instruction and a suspension canceling instruction. Further, the second control device includes: a second storage means for storing the first control amount calculating procedure and the data for first control, which is received from the first control device via the network; a second control amount calculation means for calculating the control amount regarding the first significant control based on the first control amount calculating procedure and the data for first control; and a second instruction means for transmission suspension/suspension cancellation for transmitting, to all the other control devices connected to the network, one of the transmission suspending instruction and the suspension canceling instruction.

Therefore, without providing two microcomputers having the same functions or a monitoring circuit within the control device and without being affected by the network communication status at the time of transmission, by comparing and examining the control amount regarding the first significant control, which is calculated by the first control amount calculation means, and the control amount regarding the first significant control, which is calculated by the second control device, it is possible to obtain a control system capable of reducing the cost while securing the reliability of the control.

Further, when the comparison means judges that all of the compared control amounts regarding the first significant control have the same values, the control means controls the control target based on the control amounts regarding the first significant control having the same value. When the comparison means judges that not all of the compared control amounts regarding the first significant control have the same values, the control means does not control the control target. Therefore, the reliability of the control can be improved.

Here, in the first embodiment described above, there has been given the description in which, when the notification indicating that the control amounts are different has been input from the comparison means 26, the engine control means 27 does not execute the control of the engine unit 200. However, the present invention is not limited thereto. When the notification indicating that the control amounts are different has been input from the comparison means 26, the engine control means 27 may execute the control of the engine unit 200 based on a predetermined control amount previously set as a control amount regarding the first significant engine control. Further, instead of the predetermined control amount, the engine control means 27 may use the control amount calculated last time.

In this case, even if an abnormality has occurred in any one of the control amount calculation means 25 and the control amount calculation means 35, it is possible to continue the control without stopping the engine.

Further, in the first embodiment described above, there has been given the description in which the timings at which the processing 16 of the engine control device 20 and the processing 35 of the meter control device 30 are started are synchronized with each other. However, even if a time lag has occurred in the processing start due to the timings that are not synchronized with each other, this does not inflict a significant adverse effect on an object of the present invention, which is to improve the reliability of the control.

Further, in the first embodiment described above, the control amount calculation means 25 and the control amount calculation means 35 may have an identical configuration by, for example, using microcomputers of the same model number from the same manufacturer.

In this case, the control amounts can be calculated more accurately. In addition, by executing the control of the engine unit 200 based on a result obtained through comparison between such control amounts, it is possible to improve the reliability of the control.

Further, in the first embodiment described above, the storage means 23 and the storage means 33 may have an identical configuration by, for example, using memories of the same model number from the same manufacturer. Then, the control amount calculating procedure for first significant engine control 232 may be stored at the same location of each of the memories.

In this case, the control amounts can be calculated more accurately. In addition, by executing the control of the engine unit 200 based on a result obtained through comparison among such control amounts, it is possible to improve the reliability of the control.

Further, in the first embodiment described above, the storage means 23 and the storage means 33 may have an identical configuration by, for example, using memories of the same model number from the same manufacturer. Then, the storage area for data necessary for calculation 243 and the storage area for data necessary for calculation 343, in which data necessary for calculating a control amount regarding the first significant engine control is stored, may be located at the same location of each of the memories.

In this case, the control amounts can be calculated more accurately. In addition, by executing the control of the engine unit 200 based on a result obtained through comparison among such control amounts, it is possible to improve the reliability of the control.

Further, in the first embodiment described above, there has been given the description of the case where an abnormality occurs in the control amount calculation means 25. According to the first embodiment, even if unintended data change, data corruption, or the like has occurred after the data necessary for calculating a control amount regarding the first significant engine control is transmitted to the meter control device 30 by the data transmission/reception means 21, it is possible to improve the reliability of the control by executing the control of the engine unit 200 based on a result obtained through comparison among the calculated control amounts.

Further, in the first embodiment described above, the description has been given by taking as an example a case where two control devices are provided, but the present invention is not limited thereto. The same effect can be obtained even if three or more control devices calculate control amounts regarding the first significant engine control to make comparison among the calculated control amounts.

Further, in the first embodiment described above, there has been given the description in which, when the transmission suspending instruction is transmitted from the instruction means for transmission suspension/suspension cancellation 22, the instruction means for transmission suspension/suspension cancellation 32 transmits the suspension canceling instruction, and when the transmission suspending instruction is transmitted from the instruction means for transmission suspension/suspension cancellation 32, the instruction means for transmission suspension/suspension cancellation 22 transmits the suspension canceling instruction. In other words, the suspension canceling instruction is transmitted by the instruction means for transmission suspension/suspension cancellation of the control device that has received the data regarding the first significant engine control.

However, the present invention is not limited thereto. For example, when a predetermined period of time elapses after the transmission suspending instruction has been transmitted from the instruction means for transmission suspension/suspension cancellation 22, the instruction means for transmission suspension/suspension cancellation 22 may transmit the suspension canceling instruction. Alternatively, when a predetermined period of time elapses after the transmission suspending instruction has been transmitted from the instruction means for transmission suspension/suspension cancellation 32, the instruction means for transmission suspension/suspension cancellation 32 may transmit the suspension canceling instruction. In such cases, the predetermined period of time has a time length long enough to judge that the data regarding the first significant engine control has been received on the reception side without fail.

Hereinbelow, referring to a timing chart of FIG. 5, description is given of operation of the control system, which is performed in a case where the instruction means for transmission suspension/suspension cancellation that transmitted the transmission suspending instruction transmits the suspension canceling instruction after the predetermined period of time has elapsed.

Figure 5:
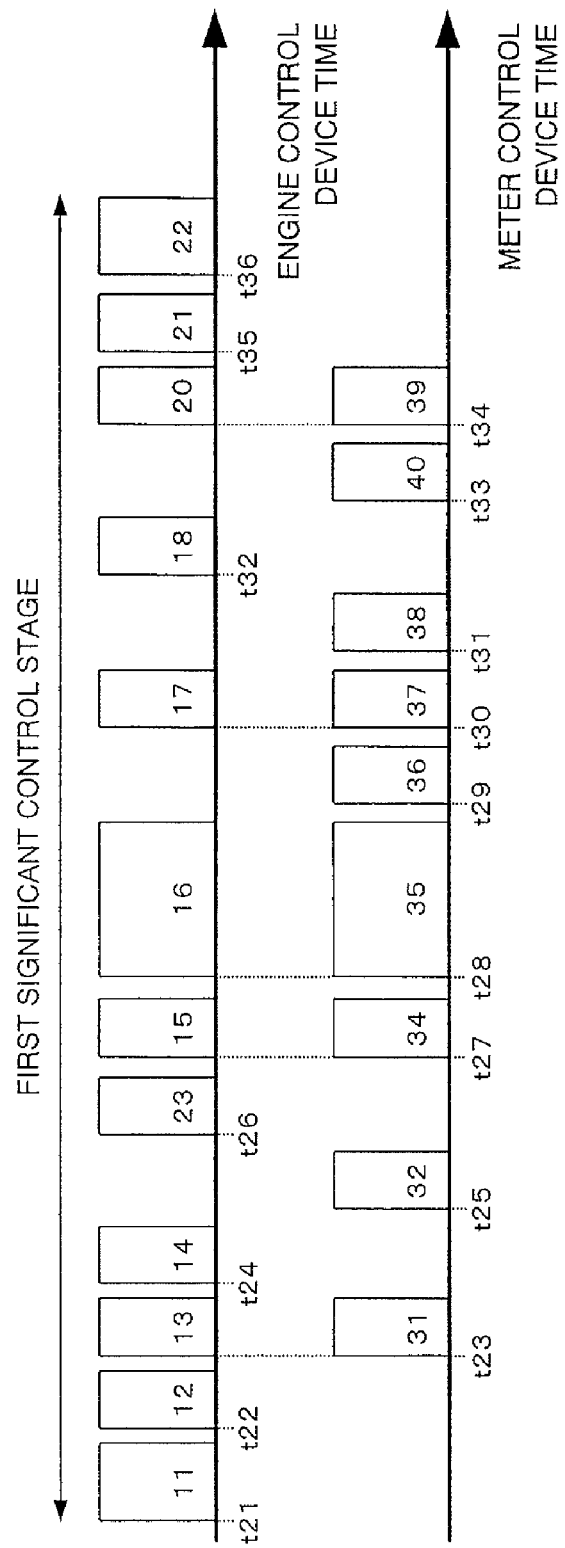
FIG. 5 is a timing chart illustrating another operation of the control system according the first embodiment of the present invention.

In the timing chart illustrated in FIG. 5, instead of the processing 33 illustrated in FIG. 4 performed by the meter control device 30, the engine control device 20 executes processing 23. Further, instead of the processing 19 performed by the meter control device 30, the engine control device 20 executes processing 40.

In the processing 23, the instruction means for transmission suspension/suspension cancellation 22 transmits, via the network 10, the suspension canceling instruction to all the other control devices connected to the network 10.

In the processing 40, the instruction means for transmission suspension/suspension cancellation 32 transmits, via the network 10, the suspension canceling instruction to all the other control devices connected to the network 10.

Further, in the timing chart illustrated in FIG. 5, processing from a time point t21 to a time point t36 of the first significant control stage is the same as the processing from the time point t1 to the time point t16 of the timing chart illustrated in FIG. 4 except for processing of a time point 26 and a time point 33, and hence description thereof is omitted.

At a time point t26, the instruction means for transmission suspension/suspension cancellation 22 executes the processing 23 to transmit, via the network 10, the suspension canceling instruction to all the other control devices connected to the network 10.

Further, at a time point t33, the instruction means for transmission suspension/suspension cancellation 32 executes the processing 40 to transmit, via the network 10, the suspension canceling instruction to all the other control devices connected to the network 10.

In this manner, with the configuration in which the suspension canceling instruction is transmitted by the instruction means for transmission suspension/suspension cancellation of the control device that has transmitted the data regarding the first significant engine control, the same effect as in the first embodiment described above can be obtained. Further, even if the instruction means for transmission suspension/suspension cancellation on the reception side is in a state of not being able to cancel the suspension of data transmission due to a failure or the like, the instruction means for transmission suspension/suspension cancellation on the transmission side can cancel the suspension of transmission by transmitting the suspension canceling instruction after the predetermined period of time has elapsed. Consequently, it is possible to reduce an adverse effect on the entire network, which is caused by continuation of the transmission suspension.

Second Embodiment

In the first embodiment described above, two or more control devices calculate control amounts regarding the first significant engine control to compare the calculated control amounts. However, the present invention is not limited thereto. Two or more control devices may each calculate control amounts regarding two or more significant controls to compare the calculated control amounts.

Hereinbelow, description is given by taking as an example a case where two control devices each calculate control amounts regarding two significant controls to compare the calculated control amounts.

Figure 6:
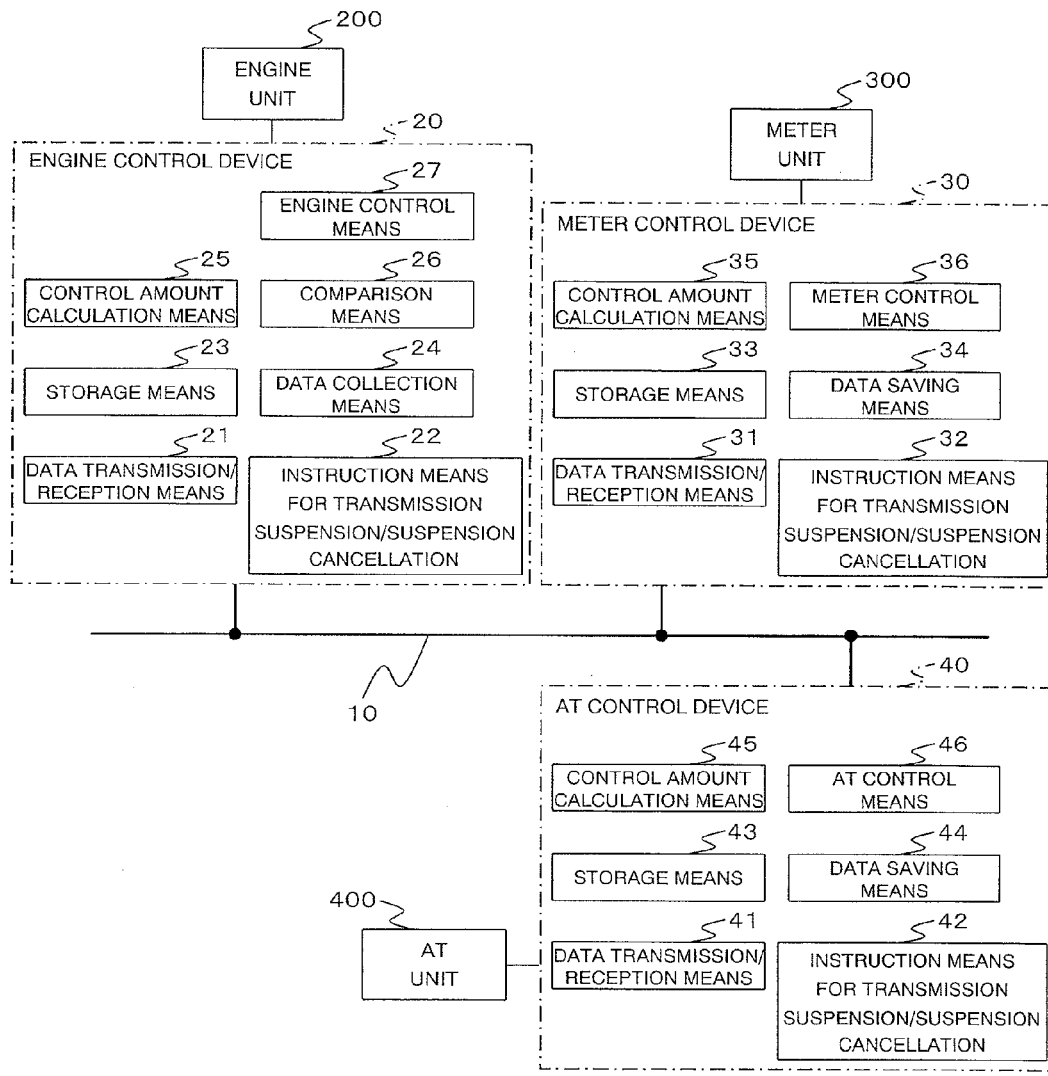
FIG. 6 is a block configuration diagram illustrating a control system according to a second embodiment of the present invention.

FIG. 6 is a block configuration diagram illustrating a control system according to a second embodiment of the present invention.

In FIG. 6, in addition to the control system illustrated in FIG. 1, the control system according to the second embodiment includes an automatic transmission (AT) control device 40 (third control device) connected to the network 10. Further, the AT control device 40 is connected to an AT unit 400, which is a control target.

Next, description is given of a configuration and functions of the AT control device 40.

The AT control device 40 includes data transmission/reception means 41, instruction means for transmission suspension/suspension cancellation 42 (third instruction means for transmission suspension/suspension cancellation), storage means 43 (third storage means), data saving means 44, control amount calculation means 45 (third control amount calculation means), and AT control means 46. Further, the control amount calculation means 45 is configured by a microcomputer.

Further, apart from the above-mentioned means, the AT control device 40 includes other necessary components. However, those components do not have direct relevance to the second embodiment, and hence description thereof is omitted.

The data transmission/reception means 41 transmits and receives data to and from, via the network 10, other control devices (including the engine control device 20 and the meter control device 30) connected to the network 10. The instruction means for transmission suspension/suspension cancellation 42 transmits, via the network 10, an instruction to suspend data transmission or an instruction to cancel suspension of data transmission to all the other control devices (including the engine control device 20 and the meter control device 30) connected to the network 10. The storage means 43 stores various pieces of data, which are described below.

The data saving means 44 causes the storage means 43 to store data necessary for calculating a control amount regarding a second significant engine control (second significant control), which is received from the engine control device 20. The control amount calculation means 45 calculates control amounts necessary for the AT control and the engine control based on a processing procedure described below. The AT control means 46 executes control of the AT unit 400 based on the calculated control amount.

Figure 7:
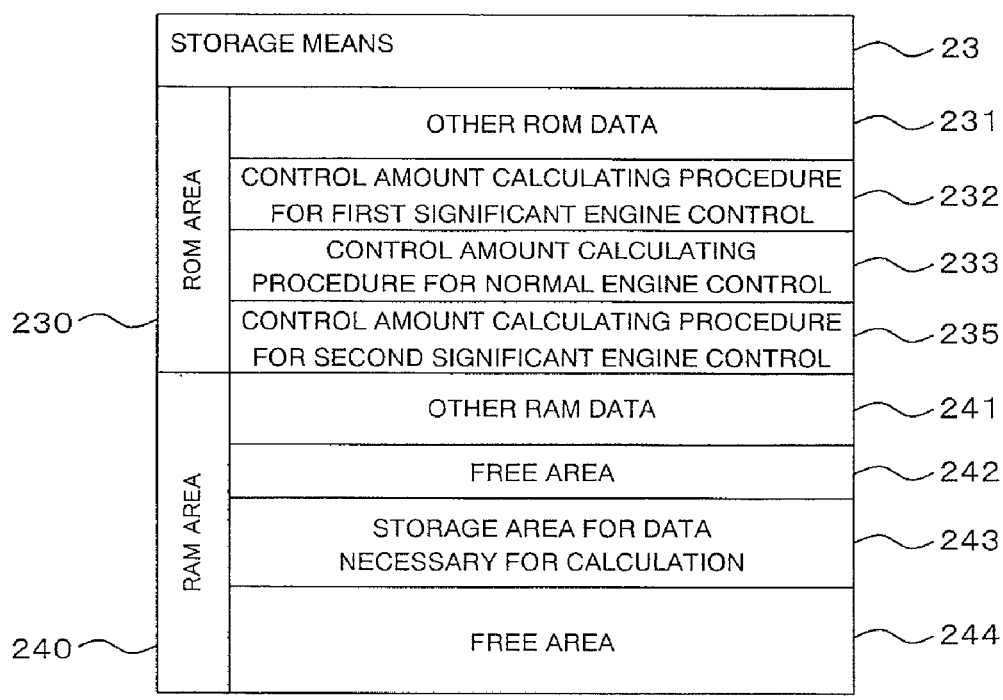
FIG. 7 is an explanatory diagram illustrating in detail storage means of an engine control device of FIG. 6.

Next, referring to FIG. 7, detailed description is given of the storage means 23 of the engine control device 20. Here, for the configuration similar to that of the first embodiment illustrated in FIG. 2, description thereof is omitted.

In FIG. 7, the ROM area 230 of the storage means 23 contains the other ROM data 231, the control amount calculating procedure for first significant engine control 232, the control amount calculating procedure for normal engine control 233, and a control amount calculating procedure for second significant engine control 235 (second control amount calculating procedure).

The control amount calculating procedure for second significant engine control 235 indicates a procedure for calculating a control amount regarding the second significant engine control, and indicates a procedure that is different from the procedure indicated by the control amount calculating procedure for first significant engine control 232.

Here, the second significant engine control refers to such control that may endanger the vehicle, the driver, the surroundings of the vehicle, etc. depending on a calculation result, and therefore refers to such control that requires high reliability.

Figure 8:
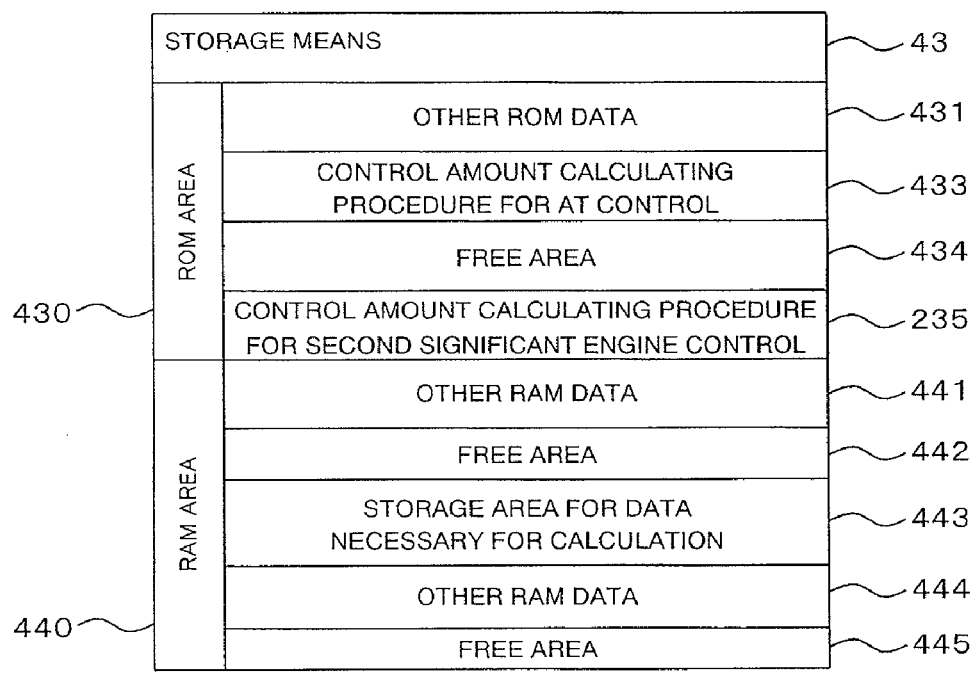
FIG. 8 is an explanatory diagram illustrating in detail storage means of an AT control device of FIG. 6.

Next, referring to FIG. 8, detailed description is given of the storage means 43 of the AT control device 40.

In FIG. 8, the storage means 43 is divided into a ROM area 430 in which no other data can be stored apart from previously-stored data and a RAM area 440 in which data can be stored.

The ROM area 430 contains other ROM data 431, a control amount calculating procedure for AT control 433, a free area 434, and the amount calculating procedure for second significant engine control 235.

Here, the other ROM data 431 and the free area 434 have no direct relevance to the second embodiment, and hence description thereof is omitted.

The control amount calculating procedure for AT control 433 indicates a procedure for calculating a control amount regarding the AT control.

The control amount calculating procedure for second significant engine control 235 indicates a procedure for calculating a control amount regarding the second significant engine control, and the storage means 23 and the storage means 43 each store the same control amount calculating procedure for second significant engine control 235.

Further, the RAM area 440 contains other RAM data 441, a free area 442, a storage area for data necessary for calculation 443, other RAM data 444, and a free area 445.

Here, the other RAM data 441, the free area 442, the other RAM data 444, and the free area 445 have no direct relevance to the second embodiment, and hence description thereof is omitted.

The storage area for data necessary for calculation 443 is an area in which data necessary for calculating a control amount regarding the second significant engine control is stored.

It should be noted that, in FIG. 6, the data transmission/reception means 21, the data transmission/reception means 31, and the data transmission/reception means 41 may be identical to one another. Similarly, in FIG. 6, the instruction means for transmission suspension/suspension cancellation 22, the instruction means for transmission suspension/suspension cancellation 32, and the instruction means for transmission suspension/suspension cancellation 42 may be identical to one another.

Further, the rest of the configuration and the functions are the same as in the first embodiment, and hence description thereof is omitted.

Hereinbelow, referring to a timing chart of FIG. 9, description is given of operation of the control system according to the second embodiment of the present invention. Here, description is given of processing related to the first significant engine control and the second significant engine control.

Figure 9:
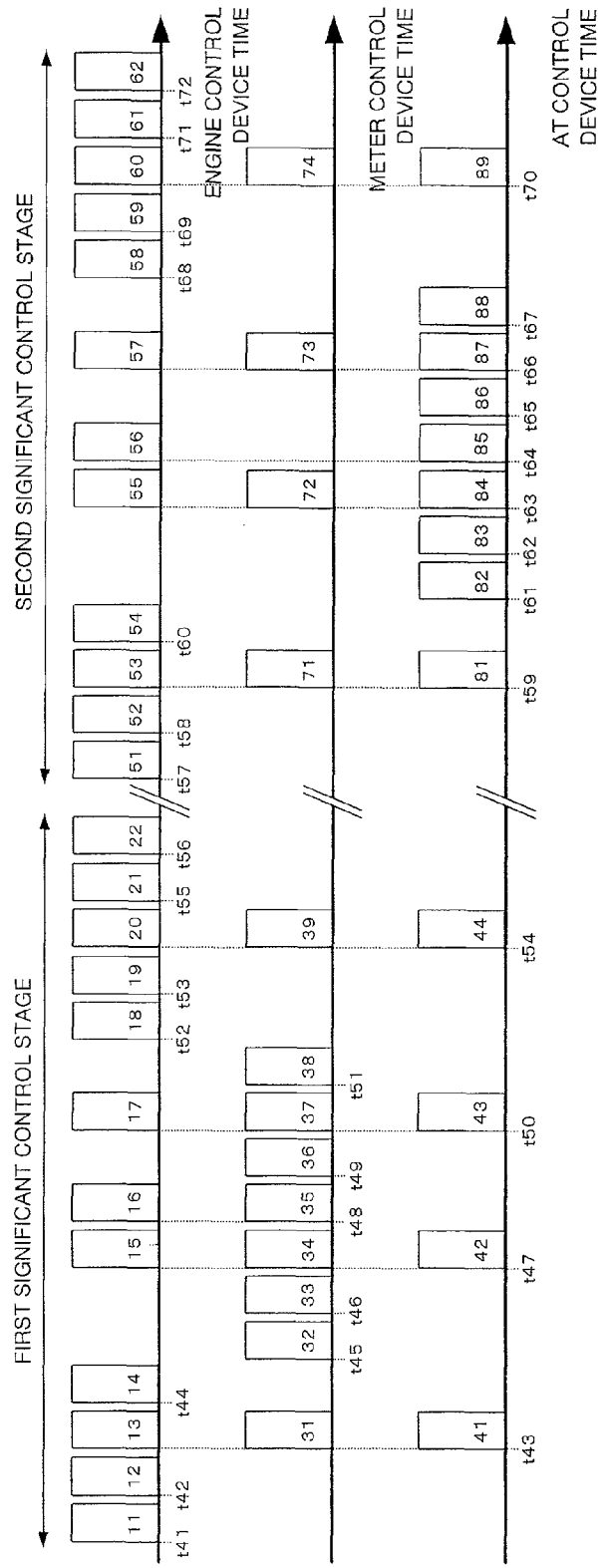
FIG. 9 is a timing chart illustrating an operation of the control system according to the second embodiment of the present invention.

In FIG. 9, the horizontal axes represent engine control device time, which indicates the flow of time in the engine control device 20, meter control device time, which indicates the flow of time in the meter control device 30, and AT control device time, which indicates the flow of time in the AT control device 40.

Further, in FIG. 9, the engine control device 20 executes, in addition to the processing of from the processing 11 to the processing 22 illustrated in FIG. 4, processing of from processing 51 to processing 62. Further, the meter control device 30 executes, in addition to the processing of from the processing 31 to the processing 39 illustrated in FIG. 4, processing of from processing 71 to processing 74. Further, the AT control device 40 executes processing of from processing 41 to processing 44 and from processing 81 to processing 89.

Here, the rest of the processing is the same as in the first embodiment, and hence description thereof is omitted.

Here, the processing of from the processing 11 to the processing 22, from the processing 31 to the processing 39, and from the processing 41 to the processing 44 is processing of the first significant control stage. On the other hand, the processing of from the processing 51 to the processing 62, from the processing 71 to the processing 74, and from the processing 81 to the processing 89 is processing of a second significant control stage.

It should be noted that the processing of the first significant control stage is repeatedly executed every time the processing related to the first significant engine control is performed, and that processing of the second significant control stage is repeatedly executed every time the processing related to the second significant engine control is performed.

Next, description is given of the processing of from the processing 41 to the processing 44 performed by the AT control device 40.

In the processing 41, the data transmission/reception means 41 suspends transmission of data irrelevant to the first significant engine control according to the transmission suspending instruction received via the network 10 from the instruction means for transmission suspension/suspension cancellation 22.

In the processing 42, the data transmission/reception means 41 resumes the transmission of data irrelevant to the first significant engine control according to the suspension canceling instruction received via the network 10 from the instruction means for transmission suspension/suspension cancellation 32.

In the processing 43, the data transmission/reception means 41 suspends the transmission of data irrelevant to the first significant engine control according to the transmission suspending instruction received via the network 10 from the instruction means for transmission suspension/suspension cancellation 32.

In the processing 44, the data transmission/reception means 41 resumes the transmission of data irrelevant to the first significant engine control according to the suspension canceling instruction received via the network 10 from the instruction means for transmission suspension/suspension cancellation 22.

Next, description is given of the processing of from the processing 51 to the processing 62 performed by the engine control device 20.

In the processing 51, the data collection means 24 collects data necessary for calculating a control amount regarding the second significant engine control (data for second control), and then causes the storage means 23 to store the collected data in the storage area for data necessary for calculation 243.

In the processing 52, the instruction means for transmission suspension/suspension cancellation 22 transmits, via the network 10, the transmission suspending instruction to all the other control devices connected to the network 10.

In the processing 53, the data transmission/reception means 21 suspends the transmission of data irrelevant to the second significant engine control according to the transmission suspending instruction transmitted from the instruction means for transmission suspension/suspension cancellation 22.

In the processing 54, the data transmission/reception means 21 transmits, to the AT control device 40, the data necessary for calculating a control amount regarding the second significant engine control.

In the processing 55, the data transmission/reception means 21 resumes the transmission of the data irrelevant to the second significant engine control according to the suspension canceling instruction that is received via the network 10 from the instruction means for transmission suspension/suspension cancellation 42.

In the processing 56, the control amount calculation means 25 calculates the control amount regarding the second significant engine control based on the data necessary for calculating the control amount regarding the second significant engine control and the control amount calculating procedure for second significant engine control 235, which are stored in the storage means 23.

In the processing 57, the data transmission/reception means 21 suspends the transmission of data irrelevant to the second significant engine control according to the transmission suspending instruction received via the network 10 from the instruction means for transmission suspension/suspension cancellation 42.

In the processing 58, the data transmission/reception means 21 receives a control amount regarding the second significant engine control, which is transmitted from the AT control device 40.

In the processing 59, the instruction means for transmission suspension/suspension cancellation 22 transmits, via the network 10, the suspension canceling instruction to all the other control devices connected to the network 10.

In the processing 60, the data transmission/reception means 21 resumes the transmission of data irrelevant to the second significant engine control according to the suspension canceling instruction transmitted from the instruction means for transmission suspension/suspension cancellation 22.

In the processing 61, the comparison means 26 compares the control amount regarding the second significant engine control, which is calculated in the processing 56, and the control amount regarding the second significant engine control, which is received in the processing 58. Then, when the two control amounts have the same value, the comparison means 26 outputs the control amount regarding the second significant engine control to the engine control means 27. When the two control amounts have different values, the comparison means 26 outputs to the engine control means 27 a notification indicating that the control amounts are different.

In the processing 62, the engine control means 27 executes control of the engine unit 200 based on a result of the comparison made by the comparison means 26. Specifically, when the control amount regarding the second significant engine control has been input from the comparison means 26, the engine control means 27 executes the control of the engine unit 200 based on this control amount. When the notification indicating that the control amounts are different has been input from the comparison means 26, the engine control means 27 does not execute the control of the engine unit 200.

Next, description is given of the processing of from the processing 71 to the processing 74 performed by the meter control device 30.

In the processing 71, the data transmission/reception means 31 suspends the transmission of data irrelevant to the second significant engine control according to the transmission suspending instruction received via the network 10 from the instruction means for transmission suspension/suspension cancellation 22.

In the processing 72, the data transmission/reception means 31 resumes the transmission of data irrelevant to the second significant engine control according to the suspension canceling instruction received, via the network 10, from the instruction means for transmission suspension/suspension cancellation 42.

In the processing 73, the data transmission/reception means 31 suspends the transmission of data irrelevant to the second significant engine control according to the transmission suspending instruction received, via the network 10, from the instruction means for transmission suspension/suspension cancellation 42.

In the processing 74, the data transmission/reception means 31 resumes the transmission of data irrelevant to the second significant engine control according to the suspension canceling instruction received, via the network 10, from the instruction means for transmission suspension/suspension cancellation 22.

Next, description is given of the processing of from the processing 81 to the processing 89 performed by the AT control device 40.

In the processing 81, the data transmission/reception means 41 suspends the transmission of data irrelevant to the second significant engine control according to the transmission suspending instruction received, via the network 10, from the instruction means for transmission suspension/suspension cancellation 22.

In the processing 82, the data transmission/reception means 41 receives the data necessary for calculating the control amount regarding the second significant engine control, which is transmitted from the engine control device 20. Then, the data saving means 44 causes the storage means 43 to store the received data in the storage area for data necessary for calculation 443.

In the processing 83, the instruction means for transmission suspension/suspension cancellation 42 transmits, via the network 10, the suspension canceling instruction to all the other control devices connected to the network 10.

In the processing 84, the data transmission/reception means 41 resumes the transmission of data irrelevant to the second significant engine control according to the suspension canceling instruction transmitted from the instruction means for transmission suspension/suspension cancellation 42.

In the processing 85, the control amount calculation means 45 calculates the control amount regarding the second significant engine control based on the data necessary for calculating the control amount regarding the second significant engine control, and the control amount calculating procedure for second significant engine control 235, which are stored in the storage means 43.

In the processing 86, the instruction means for transmission suspension/suspension cancellation 42 transmits, via the network 10, the transmission suspending instruction to all the other control devices connected to the network 10.

In the processing 87, the data transmission/reception means 41 suspends the transmission of data irrelevant to the second significant engine control according to the transmission suspending instruction transmitted from the instruction means for transmission suspension/suspension cancellation 42.

In the processing 88, the data transmission/reception means 41 transmits, to the engine control device 20, the control amount regarding the second significant engine control, which is calculated in the processing 85.

In the processing 89, the data transmission/reception means 41 resumes the transmission of data irrelevant to the second significant engine control according to the suspension canceling instruction received via the network 10 from the instruction means for transmission suspension/suspension cancellation 22.

Here, the processing 16 of the engine control device 20 and the processing 35 of the meter control device 30 are started at a timing when a predetermined period of time has elapsed after reception of the suspension canceling instructions in the processing 15 and the processing 34, respectively. In this manner, by synchronizing the timings with each other, it is possible to execute the processing 16 and the processing 35 at the same timing.

Further, the processing 56 of the engine control device 20 and the processing 85 of the AT control device 40 are started at a timing when a predetermined period of time has elapsed after reception of the suspension canceling instructions in the processing 55 and the processing 84, respectively. In this manner, by synchronizing the timings with each other, it is possible to execute the processing 56 and the processing 85 at the same timing.

In the timing chart illustrated in FIG. 9, only the processing related to the first significant engine control and the processing related to the second significant engine control are illustrated for the purpose of clarifying the features of the second embodiment. However, in actuality, not only these processings, there exist processing related to the normal engine control, processing related to the meter control and processing related to the AT control in the engine control device 20, in the meter control device 30, and in the AT control device 40, respectively. These processings are executed in each of the control devices during the free time in which the processing related to the first significant engine control (processing of the first significant control stage and processing of the second significant control stage illustrated in FIG. 9) is not executed.

Next, referring to the timing chart of FIG. 9, description is given of operation of the control system, which is performed in a case where there is no abnormality in the control amount calculation means 25, the control amount calculation means 35, and the control amount calculation means 45, enabling the control amount regarding the first significant engine control and the control amount regarding the second significant engine control to be calculated accurately.

First of all, description is given of the processing of the first significant control stage.

First, at a time point t41, the data collection means 24 executes the processing 11 to cause the storage means 23 to store the data necessary for calculating the control amount regarding the first significant engine control in the storage area for data necessary for calculation 243.

Next, at a time point t42, the instruction means for transmission suspension/suspension cancellation 22 executes the processing 12 to transmit, via the network 10, the transmission suspending instruction to all the other control devices connected to the network 10.

Next, at a time point t43, the data transmission/reception means 21, the data transmission/reception means 31, and the data transmission/reception means 41 simultaneously execute the processing 13, the processing 31, and the processing 41, respectively, to suspend the transmission of data irrelevant to the first significant engine control according to the transmission suspending instruction transmitted from the instruction means for transmission suspension/suspension cancellation 22.

Next, at a time point t44, the data transmission/reception means 21 executes the processing 14 to transmit, via the network 10, the data necessary for calculating the control amount regarding the first significant engine control to the meter control device 30.

Next, at a time point t45, the data transmission/reception means 31 and the data saving means 34 execute the processing 32 to cause the storage means 33 to store, in the storage area for data necessary for calculation 343, the received data necessary for calculating the control amount regarding the first significant engine control.

Next, at a time point t46, the instruction means for transmission suspension/suspension cancellation 32 executes the processing 33 to transmit, via the network 10, the suspension canceling instruction to all the other control devices connected to the network 10.

Next, at a time point t47, the data transmission/reception means 21, the data transmission/reception means 31, and the data transmission/reception means 41 simultaneously execute the processing 15, the processing 34, and the processing 42, respectively, to resume the transmission of data irrelevant to the first significant engine control according to the suspension canceling instruction transmitted from the instruction means for transmission suspension/suspension cancellation 32.

Next, at a time point t48, by using the above-mentioned method of synchronizing the timings with each other, the control amount calculation means 25 and the control amount calculation means 35 simultaneously execute the processing 16 and the processing 35, respectively. The control amount calculation means 25 and the control amount calculation means 35 calculate control amounts regarding the first significant engine control based on the control amount calculating procedure for first significant engine control 232 and the respective pieces of data necessary for calculating the control amount regarding the first significant engine control, which are stored in the storage means 23 and the storage means 33.

Next, at a time point t49, the instruction means for transmission suspension/suspension cancellation 32 executes the processing 36 to transmit, via the network 10, the transmission suspending instruction to all the other control devices connected to the network 10.

Next, at a time point t50, the data transmission/reception means 21, the data transmission/reception means 31, and the data transmission/reception means 41 simultaneously execute the processing 17, the processing 37, and the processing 43, respectively, to suspend the transmission of data irrelevant to the first significant engine control according to the transmission suspending instruction transmitted from the instruction means for transmission suspension/suspension cancellation 32.

Next, at a time point t51, the data transmission/reception means 31 executes the processing 38 to transmit the control amount regarding the first significant engine control, which is calculated in the processing 35, to the engine control device 20 via the network 10.

Next, at a time point t52, the data transmission/reception means 21 executes the processing 18 to receive the control amount regarding the first significant engine control, which is transmitted via the network 10 from the meter control device 30.

Next, at a time point t53, the instruction means for transmission suspension/suspension cancellation 22 executes the processing 19 to transmit, via the network 10, the suspension canceling instruction to all the other control devices connected to the network 10.

Next, at a time point t54, the data transmission/reception means 21, the data transmission/reception means 31, and the data transmission/reception means 41 simultaneously execute the processing 20 and the processing 39, and the processing 44, respectively, to resume the transmission of data irrelevant to the first significant engine control according to the suspension canceling instruction transmitted from the instruction means for transmission suspension/suspension cancellation 22.

Next, at a time point t55, the comparison means 26 executes the processing 21 to compare the control amount regarding the first significant engine control, which is calculated in the processing 16, and the control amount regarding the first significant engine control, which is received in the processing 18. Here, because there is no abnormality in both of the control amount calculation means 25 and the control amount calculation means 35, the control amounts regarding the first significant engine control have the same value. Accordingly, the comparison means 26 outputs the control amount regarding the first significant engine control to the engine control means 27.

Next, at a time point t56, the engine control means 27 executes the processing 22 to execute the control of the engine unit 200 based on the control amount regarding the first significant engine control, which has been input from the comparison means 26.

Next, description is given of the processing of the second significant control stage.

First, at a time point t57, the data collection means 24 executes the processing 51 to cause the storage means 23 to store the data necessary for calculating the control amount regarding the second significant engine control in the storage area for data necessary for calculation 243.

Next, at a time point t58, the instruction means for transmission suspension/suspension cancellation 22 executes the processing 52 to transmit, via the network 10, the transmission suspending instruction to all the other control devices connected to the network 10.

Next, at a time point t59, the data transmission/reception means 21, the data transmission/reception means 31, and the data transmission/reception means 41 simultaneously execute the processing 53, the processing 71, and the processing 81, respectively, to suspend the transmission of data irrelevant to the second significant engine control according to the transmission suspending instruction transmitted from the instruction means for transmission suspension/suspension cancellation 22.

Next, at a time point t60, the data transmission/reception means 21 executes the processing 54 to transmit, via the network 10, the data necessary for calculating the control amount regarding the second significant engine control to the AT control device 40.

Next, at a time point t61, the data transmission/reception means 41 and the data saving means 44 execute the processing 82 to cause the storage means 43 to store, in the storage area for data necessary for calculation 443, the received data necessary for calculating the control amount regarding the second significant engine control.

Next, at a time point t62, the instruction means for transmission suspension/suspension cancellation 42 executes the processing 83 to transmit, via the network 10, the suspension canceling instruction to all the other control devices connected to the network 10.

Next, at a time point t63, the data transmission/reception means 21, the data transmission/reception means 31, and the data transmission/reception means 41 simultaneously execute the processing 55, the processing 72, and the processing 84, respectively, to resume the transmission of data irrelevant to the second significant engine control according to the suspension canceling instruction transmitted from the instruction means for transmission suspension/suspension cancellation 42.

Next, at a time point t64, by using the above-mentioned method of synchronizing the timings with each other, the control amount calculation means 25 and the control amount calculation means 45 simultaneously execute the processing 56 and the processing 85, respectively. The control amount calculation means 25 and the control amount calculation means 45 calculate control amounts regarding the second significant engine control based on the control amount calculating procedure for second significant engine control 235 and the respective pieces of data necessary for calculating the control amount regarding the second significant engine control, which are stored in the storage means 23 and the storage means 43.

Next, at a time point t65, the instruction means for transmission suspension/suspension cancellation 42 executes the processing 86 to transmit, via the network 10, the transmission suspending instruction to all the other control devices connected to the network 10.

Next, at a time point t66, the data transmission/reception means 21, the data transmission/reception means 31, and the data transmission/reception means 41 simultaneously execute the processing 57, the processing 73, and the processing 87, respectively, to suspend the transmission of data irrelevant to the second significant engine control according to the transmission suspending instruction transmitted from the instruction means for transmission suspension/suspension cancellation 42.

Next, at a time point t67, the data transmission/reception means 41 executes the processing 88 to transmit the control amount regarding the second significant engine control, which is calculated in the processing 85, to the engine control device 20 via the network 10.

Next, at a time point t68, the data transmission/reception means 21 executes the processing 58 to receive the control amount regarding the second significant engine control, which is transmitted via the network 10 from the AT control device 40.

Next, at a time point t69, the instruction means for transmission suspension/suspension cancellation 22 executes the processing 59 to transmit, via the network 10, the suspension canceling instruction to all the other control devices connected to the network 10.

Next, at a time point t70, the data transmission/reception means 21, the data transmission/reception means 31, and the data transmission/reception means 41 simultaneously execute the processing 60, and the processing 74, and the processing 89, respectively, to resume the transmission of data irrelevant to the second significant engine control according to the suspension canceling instruction transmitted from the instruction means for transmission suspension/suspension cancellation 22.

Next, at a time point t71, the comparison means 26 executes the processing 61 to compare the control amount regarding the second significant engine control, which is calculated in the processing 56, and the control amount regarding the second significant engine control, which is received in the processing 58. Here, because there is no abnormality in both of the control amount calculation means 25 and the control amount calculation means 45, the control amounts regarding the second significant engine control have the same value. Accordingly, the comparison means 26 outputs the control amount regarding the second significant engine control to the engine control means 27.

Next, at a time point t72, the engine control means 27 executes the processing 62 to execute the control of the engine unit 200 based on the control amount regarding the second significant engine control, which has been input from the comparison means 26.

Next, with reference to the timing chart of FIG. 9, description is given of operation of the control system, which is performed in a case where there is an abnormality in any one of the control amount calculation means 25, the control amount calculation means 35, and the control amount calculation means 45. Here, the description is given by taking as an example a case where, due to an abnormality in the control amount calculation means 25, only the control amount regarding the second significant engine control cannot be calculated accurately while the control amount regarding the first significant engine control can be calculated accurately.

It should be noted that because the processing of the first significant control stage and the processing from the time point t57 to the time point t63 of the second significant control stage are the same as the above-mentioned processing performed in a case where there is no abnormality in the control amount calculation means 25, the control amount calculation means 35, and the control amount calculation means 45, description thereof is omitted.

First, at the time point t64, the control amount calculation means 25 and the control amount calculation means 45 simultaneously execute the processing 56 and the processing 85, respectively. The control amount calculation means 25 calculates the control amount regarding the second significant engine control based on the data necessary for calculating the control amount regarding the second significant engine control and the control amount calculating procedure for second significant engine control 235, which are stored in the storage means 23. Here, because, due to an abnormality in the control amount calculation means 25, only the control amount regarding the second significant engine control cannot be calculated accurately, the calculated control amount regarding the second significant engine control has a different value from the control amount that is to be obtained originally.

On the other hand, the control amount calculation means 45 calculates the control amount regarding the second significant engine control based on the data necessary for calculating the control amount regarding the second significant engine control and the control amount calculating procedure for second significant engine control 235, which are stored in the storage means 43.

Further, the processing from the time point t65 to the time point t70 of the second significant control stage is also the same as the above-mentioned processing performed in a case where there is no abnormality in the control amount calculation means 25, the control amount calculation means 35, and the control amount calculation means 45, and hence description thereof is omitted.

Next, at the time point t71, the comparison means 26 executes the processing 61 to compare the control amount regarding the second significant engine control, which is calculated in the processing 56, and the control amount regarding the second significant engine control, which is received in the processing 58. Here, because there is an abnormality in the control amount calculation means 25, the control amounts regarding the second significant engine control have different values. Accordingly, the comparison means 26 outputs to the engine control means 27 the notification indicating that the control amounts are different.

Next, at the time point t72, the engine control means 27 executes the processing 62. However, due to input of the notification indicating that the control amounts are different from the comparison means 26, the engine control means 27 does not execute the control of the engine unit 200.

In this manner, by comparing the control amount regarding the first significant engine control, which is calculated by the control amount calculation means 25, and the control amount regarding the first significant engine control, which is calculated by the control amount calculation means 35, and comparing and examining the control amount regarding the second significant engine control, which is calculated by the control amount calculation means 25, and the control amount regarding the second significant engine control, which is calculated by the control amount calculation means 45, it is possible to detect whether or not there is an abnormality in any one of the control amount calculation means 25, the control amount calculation means 35, and the control amount calculation means 45.

Specifically, by comparing the control amount regarding the first significant engine control, which is calculated by the control amount calculation means 25, and the control amount regarding the first significant engine control, which is calculated by the control amount calculation means 35, and comparing the control amount regarding the second significant engine control, which is calculated by the control amount calculation means 25, and the control amount regarding the second significant engine control, which is calculated by the control amount calculation means 45, and, when the respective pairs of the control amounts have the same values, executing the control of the engine unit 200 based on the respective control amounts, and, when at least one pair of the control amounts has different values, avoiding executing the control of the engine unit 200 for both the significant controls, it is possible to reduce the cost of the control system while securing the reliability of the control without providing two microcomputers or a monitoring circuit within the engine control device 20 and without being affected by the network communication status at the time of transmission.

Further, while the control amount regarding the first significant engine control or the control amount regarding the second significant engine control is being calculated in the engine control device 20 (original calculation), the corresponding control amounts are simultaneously calculated by the control amount calculation means 35 of the meter control device 30 and the control amount calculation means 45 of the AT control device 40, to thereby compare results of the calculations. Then, when at least one pair of the control amounts has the same value, the control of the engine unit 200 is executed only for the first significant engine control or the second significant engine control, for which the control amounts have the same value. As a result, at the time of carrying out not the calculation for the abnormality detection but the original calculation, it is possible to judge whether or not there is an abnormality, thereby securing the reliability of the control.

In addition, while the control amount regarding the first significant engine control is being calculated in the engine control device 20, the corresponding control amount is simultaneously calculated by the control amount calculation means 35 of the meter control device 30. Consequently, comparison between the calculation results can be made as soon as possible, and hence it is also possible to reduce a processing time required for the first significant engine control.

Further, while the control amount regarding the second significant engine control is being calculated in the engine control device 20, the corresponding control amount is simultaneously calculated by the control amount calculation means 45 of the AT control device 40. Consequently, comparison between the calculation results can be made as soon as possible, and hence it also becomes possible to reduce a processing time required for the second significant engine control.

As described above, according to the second embodiment, there are provided a first control device, a second control device, and a third control device, which are connected to a network in which availability of transmission is determined based on a communication status at the time of the transmission. The first control device includes: a first control amount calculation means for calculating a control amount regarding a first significant control and a control amount regarding a second significant control based on a first control amount calculating procedure for calculating the control amount regarding the first significant control, a second control amount calculating procedure for calculating the control amount regarding the second significant control, data for first control necessary for calculating the control amount regarding the first significant control for the control target of the first control device, and data for second control necessary for calculating the control amount regarding the second significant control for the control target of the first control device; comparison means for comparing the control amount regarding the first significant control, which is calculated by the first control amount calculation means, and the control amount regarding the first significant control, which is calculated by the second control device, and comparing the control amount regarding the second significant control, which is calculated by the first control amount calculation means, and the control amount regarding the second significant control, which is calculated by the third control device; control means for controlling the control target based on results of the comparison made by the comparison means; and a first instruction means for transmission suspension/suspension cancellation for transmitting, to all the other control devices connected to the network, one of a transmission suspending instruction and a suspension canceling instruction. Further, the second control device includes: a second storage means for storing the first control amount calculating procedure and the data for first control, which is received from the first control device via the network; a second control amount calculation means for calculating the control amount regarding the first significant control based on the first control amount calculating procedure and the data for first control; and a second instruction means for transmission suspension/suspension cancellation for transmitting, to all the other control devices connected to the network, one of the transmission suspending instruction and the suspension canceling instruction. Further, the third control device includes: a third storage means for storing the second control amount calculating procedure and the data for second control, which is received from the first control device via the network; a third control amount calculation means for calculating the control amount regarding the second significant control based on the second control amount calculating procedure and the data for second control; and a third instruction means for transmission suspension/suspension cancellation for transmitting, to all the other control devices connected to the network, one of the transmission suspending instruction and the suspension canceling instruction.

Therefore, without providing two microcomputers having the same functions or a monitoring circuit within the control device and without being affected by the network communication status at the time of transmission, by comparing the control amount regarding the first significant control, which is calculated by the first control amount calculation means, and the control amount regarding the first significant control, which is calculated by the second control device, and comparing and examining the control amount regarding the second significant control, which is calculated by the first control amount calculation means, and the control amount regarding the second significant control, which is calculated by the third control device, it is possible to obtain a control system capable of reducing the cost while securing the reliability of the control.

Further, when the comparison means judges that the compared control amounts regarding the first significant control and the compared control amounts regarding the second significant control have the same values, respectively, the control means controls the control target based on the control amounts regarding the first significant control having the same value and the control amounts regarding the second significant control having the same value. When the comparison means judges that at least one of a pair of the compared control amounts regarding the first significant control and a pair of the compared control amounts regarding the second significant control has different values, the control means does not control the control target. Further, when the comparison means judges that at least one of a pair of the compared control amounts regarding the first significant control and a pair of the compared control amounts regarding the second significant control has different values, the control device controls the control target only for the first significant control or the second significant control, for which the control amounts have the same value. Therefore, the reliability of the control can be improved.

Here, in the second embodiment described above, there has been given the description in which, when the notification indicating that the control amounts are different has been input from the comparison means 26, the engine control means 27 does not execute the control of the engine unit 200. However, the present invention is not limited thereto. When the notification indicating that the control amounts are different has been input from the comparison means 26, the engine control means 27 may execute the control of the engine unit 200 with regard to the significant control for which the control amounts are different or with regard to both the significant controls, based on predetermined control amounts previously set as a control amount regarding the first significant engine control and a control amount regarding the second significant engine control, respectively. Further, instead of the predetermined control amounts, the engine control means 27 may use the control amount calculated last time.

In this case, even if an abnormality has occurred in any one of the control amount calculation means 25, the control amount calculation means 35, and the control amount calculation means 45, it is possible to continue the control without stopping the engine.

Further, in the second embodiment described above, there has been given the description in which the timings at which the processing 16 of the engine control device 20 and the processing 35 of the meter control device 30 are started are synchronized with each other. However, even if a time lag has occurred in the processing start due to the timings that are not synchronized with each other, this does not inflict a significant adverse effect on an object of the present invention, which is to improve the reliability of the control.

Further, in the second embodiment described above, there has been given the description in which the timings at which the processing 56 of the engine control device 20 and the processing 85 of the AT control device 40 are started are synchronized with each other. However, even if a time lag has occurred in the processing start due to the timings that are not synchronized with each other, this does not inflict a significant adverse effect on the object of the present invention, which is to improve the reliability of the control.

Further, in the second embodiment described above, the control amount calculation means 25, the control amount calculation means 35, and the control amount calculation means 45 may have an identical configuration by, for example, using microcomputers of the same model number from the same manufacturer.

In this case, the control amounts can be calculated more accurately. In addition, by executing the control of the engine unit 200 based on results obtained through comparison among such control amounts, it is possible to improve the reliability of the control.

Further, in the second embodiment described above, the storage means 23, the storage means 33, and the storage means 43 may have an identical configuration by, for example, using memories of the same model number from the same manufacturer. Then, the control amount calculating procedure for first significant engine control 232 may be stored at the same location of each of the storage means 23 and the storage means 33. The control amount calculating procedure for second significant engine control 235 may be stored at the same location of each of the storage means 23 and the storage means 43.

In this case, the control amounts can be calculated more accurately. In addition, by executing the control of the engine unit 200 based on results obtained through comparison among such control amounts, it is possible to improve the reliability of the control.

Further, in the second embodiment described above, the storage means 23, the storage means 33, and the storage means 43 may have an identical configuration by, for example, using memories of the same model number from the same manufacturer. Then, the storage area for data necessary for calculation 243 and the storage area for data necessary for calculation 343, in which data necessary for calculating a control amount regarding the first significant engine control is stored, may be located at the same location of each of the storage means 23 and the storage means 33. The storage area for data necessary for calculation 243 and the storage area for data necessary for calculation 443, in which data necessary for calculating a control amount regarding the second significant engine control is stored, may be located at the same location of each of the storage means 23 and the storage means 43.

In this case, the control amounts can be calculated more accurately. In addition, by executing the control of the engine unit 200 based on results obtained through comparison among such control amounts, it is possible to improve the reliability of the control.

Further, in the second embodiment described above, there has been given the description of the case where an abnormality occurs in the control amount calculation means 25. According to the second embodiment, even if unintended data change, data corruption, or the like has occurred after the data necessary for calculating a control amount regarding the first significant engine control is transmitted to the meter control device 30 by the data transmission/reception means 21 or after the data necessary for calculating a control amount regarding the second significant engine control is transmitted to the AT control device 40 by the data transmission/reception means 21, it is possible to improve the reliability of the control by executing the control of the engine unit 200 based on results obtained through comparison among the calculated control amounts.

Further, in the second embodiment described above, there has been given the description by taking as an example the case where three control devices are used, but the present invention is not limited thereto. Even if four or more control devices are used, the same effect can be obtained.

Further, in the second embodiment described above, the following description has been given. That is, when the transmission suspending instruction has been transmitted from the instruction means for transmission suspension/suspension cancellation 22, the instruction means for transmission suspension/suspension cancellation 32 or the instruction means for transmission suspension/suspension cancellation 42 transmits the suspension canceling instruction. When the transmission suspending instruction has been transmitted from the instruction means for transmission suspension/suspension cancellation 32 or the instruction means for transmission suspension/suspension cancellation 42, the instruction means for transmission suspension/suspension cancellation 22 transmits the suspension canceling instruction. However, the present invention is not limited thereto. For example, when a predetermined period of time has elapsed after transmission of the transmission suspending instruction from the instruction means for transmission suspension/suspension cancellation 22, the instruction means for transmission suspension/suspension cancellation 22 may transmit the suspension canceling instruction. Alternatively, when a predetermined period of time has elapsed after transmission of the transmission suspending instruction from the instruction means for transmission suspension/suspension cancellation 32 or the instruction means for transmission suspension/suspension cancellation 42, the instruction means for transmission suspension/suspension cancellation 32 or the instruction means for transmission suspension/suspension cancellation 42 may transmit the suspension canceling instruction. In such cases, the predetermined period of time has a time length long enough to judge that the data regarding the first significant engine control or the data regarding the second significant engine control has been received on the reception side without fail.

In this manner, the suspension canceling instruction is transmitted by the instruction means for transmission suspension/suspension cancellation of the control device that has transmitted the data regarding the first significant engine control or the data regarding the second significant engine control, and hence the same effect as in the second embodiment described above can be obtained. Further, even if the instruction means for transmission suspension/suspension cancellation on the reception side is in a state of not being able to cancel the suspension of data transmission due to a failure or the like, the instruction means for transmission suspension/suspension cancellation on the transmission side can cancel the suspension of transmission by transmitting the suspension canceling instruction after the predetermined period of time. Consequently, it is possible to reduce an adverse effect on the entire network, which is caused by continuation of the transmission suspension.

Further, in the first and second embodiments described above, the storage means and the control amount calculation means are described as being separate components, but the present invention is not limited thereto. Even if a storage area is provided inside the control amount calculation means, the same effect can be obtained.

Further, in the first and second embodiments described above, no detailed description has been given of the timing at which each of the instruction means for transmission suspension/suspension cancellation 22, the instruction means for transmission suspension/suspension cancellation 32, and the instruction means for transmission suspension/suspension cancellation 42 transmits the transmission suspending instruction. However, by putting a higher priority on transmission data containing the transmission suspending instruction than other pieces of transmission data, and by transmitting the transmission suspending instruction with a sufficient time lag in consideration of a case where the data has already been transmitted to the network 10, it is possible to suspend the data transmission from the other control devices without fail before the data regarding the significant engine control starts to be transmitted.

Third Embodiment

Figure 10:
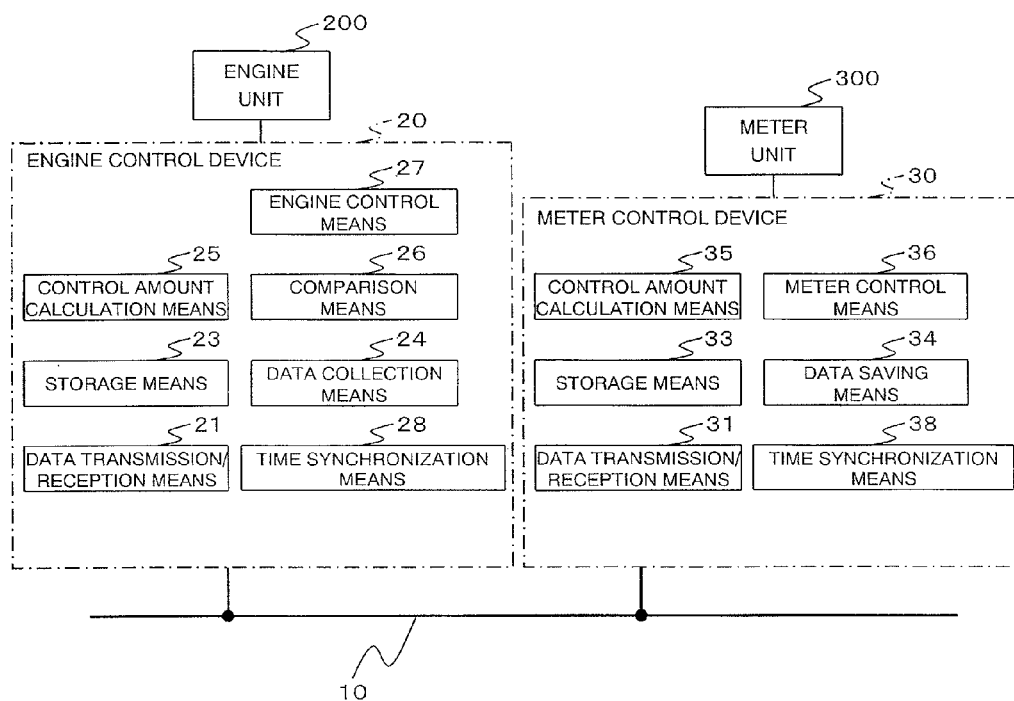
FIG. 10 is a block configuration diagram illustrating a control system according to a third embodiment of the present invention.

FIG. 10 is a block configuration diagram illustrating a control system according to a third embodiment of the present invention.

In FIG. 10, the control system includes a vehicle-mounted network 10 (hereinbelow, referred to as "network 10"), an engine control device 20 (first control device) connected to the network 10, and a meter control device 30 (second control device). Further, the engine control device 20 and the meter control device 30 are connected to an engine unit 200 and a meter unit 300, respectively, which are control targets.

Here, as the network 10, there is employed a FlexRay network for performing communication compliant with the FlexRay (registered trademark) communication protocol V2.1 Rev.A (hereinbelow, referred to as "FlexRay communication"). With this FlexRay network, time synchronization is possible between nodes connected thereto. Incidentally, FlexRay communication is a well-known technology, and hence detailed description thereof is omitted.

It should be noted that the network is not limited to the network described above, and another network may be used as long as the network is capable of time synchronization between nodes connected thereto.

Next, description is given of a configuration and functions of the engine control device 20.

The engine control device 20 includes data transmission/reception means 21, time synchronization means 28 (first time synchronization means), storage means 23 (first storage means), data collection means 24, control amount calculation means 25 (first control amount calculation means), comparison means 26, and engine control means 27 (control means). Further, the control amount calculation means 25 is configured by a microcomputer.

Further, apart from the above-mentioned means, the engine control device 20 includes other necessary components.

However, those components do not have direct relevance to the third embodiment, and hence description thereof is omitted.

The data transmission/reception means 21 transmits and receives data to and from, via the network 10, other control devices (including the meter control device 30) connected to the network 10. The time synchronization means 28 executes time synchronization between control devices connected to the network 10. The storage means 23 stores various pieces of data, which are described below.

The data collection means 24 collects data necessary for engine control (data for first control). The control amount calculation means 25 calculates a control amount necessary for the engine control according to a processing procedure described below. The comparison means 26 compares the control amount calculated by the control amount calculation means 25 with a control amount received from the other control devices (including the meter control device 30) connected to the network 10. The engine control means 27 executes control of the engine unit 200 based on the calculated control amount.

Next, referring to FIG. 2, detailed description is given of the storage means 23 of the engine control device 20.

In FIG. 2, the storage means 23 is divided into a ROM area 230 in which no other data can be stored apart from previously-stored data and a RAM area 240 in which data can be stored.

The ROM area 230 contains other ROM data 231, a control amount calculating procedure for first significant engine control (first significant control) 232 (first control amount calculating procedure), a control amount calculating procedure for normal engine control 233, and a free area 234.

Here, the other ROM data 231 and the free area 234 have no direct relevance to the third embodiment, and hence description thereof is omitted.

The control amount calculating procedure for first significant engine control 232 indicates a procedure for calculating a control amount regarding the first significant engine control, whereas the control amount calculating procedure for normal engine control 233 indicates a procedure for calculating a control amount regarding the normal engine control.

Here, the first significant engine control refers to such control that may endanger the vehicle, the driver, the surroundings of the vehicle, etc. depending on a calculation result, and therefore refers to such control that requires high reliability.

Further, the RAM area 240 contains other RAM data 241, a free area 242, a storage area for data necessary for calculation 243, and a free area 244.

Here, the other RAM data 241, the free area 242, and the free area 244 have no direct relevance to the third embodiment, and hence description thereof is omitted.

The storage area for data necessary for calculation 243 is an area in which data necessary for calculating a control amount regarding the first significant engine control is stored.

Next, referring back to FIG. 10, description is given of a configuration and functions of the meter control device 30.

The meter control device 30 includes data transmission/reception means 31, time synchronization means 38 (second time synchronization means), storage means 33 (second storage means), data saving means 34, control amount calculation means 35 (second control amount calculation means), and meter control means 36. Further, the control amount calculation means 35 is configured by a microcomputer.

Further, apart from the above-mentioned means, the meter control device 30 includes other necessary components.

However, those components do not have direct relevance to the third embodiment, and hence description thereof is omitted.

The data transmission/reception means 31 transmits and receives data to and from, via the network 10, other control devices (including the engine control device 20) connected to the network 10. The time synchronization means 38 executes time synchronization between control devices connected to the network 10. The storage means 33 stores various pieces of data, which are described below.

The data saving means 34 causes the storage means 33 to store the data necessary for calculating the control amount regarding the first significant engine control, which is received from the engine control device 20. The control amount calculation means 35 calculates a control amount necessary for the meter control and the engine control according to a processing procedure described below. The meter control means 36 executes control of the meter unit 300 based on the calculated control amount.

Next, referring to FIG. 3, detailed description is given of the storage means 33 of the meter control device 30.

In FIG. 3, the storage means 33 is divided into a ROM area 330 in which no other data can be stored apart from previously-stored data and a RAM area 340 in which data can be stored.

The ROM area 330 contains other ROM data 331, a control amount calculating procedure for first significant engine control 232, a control amount calculating procedure for meter control 333, and a free area 334.

Here, the other ROM data 331 and the free area 334 have no direct relevance to the third embodiment, and hence description thereof is omitted.

The control amount calculating procedure for first significant engine control 232 indicates a procedure for calculating a control amount regarding the first significant engine control. The storage means 23 and the storage means 33 each store the same control amount calculating procedure for first significant engine control. The control amount calculating procedure for meter control 333 indicates a procedure for calculating a control amount regarding the meter control.

Further, the RAM area 340 contains other RAM data 341, a free area 342, a storage area for data necessary for calculation 343, other RAM data 344, and a free area 345.

Here, the other RAM data 341, the free area 342, the other RAM data 344, and the free area 345 have no direct relevance to the third embodiment, and hence description thereof is omitted.

The storage area for data necessary for calculation 343 is an area in which data necessary for calculating a control amount regarding the first significant engine control is stored.

It should be noted that, in FIG. 10, the data transmission/reception means 21 and the data transmission/reception means 31 may be identical to each other. Similarly, in FIG. 10, the time synchronization means 28 and the time synchronization means 38 may be identical to each other.

Hereinbelow, referring to a timing chart of FIG. 11, description is given of operation of the control system according to the third embodiment of the present invention. Here, description is given of processing related to the first significant engine control.

Figure 11:
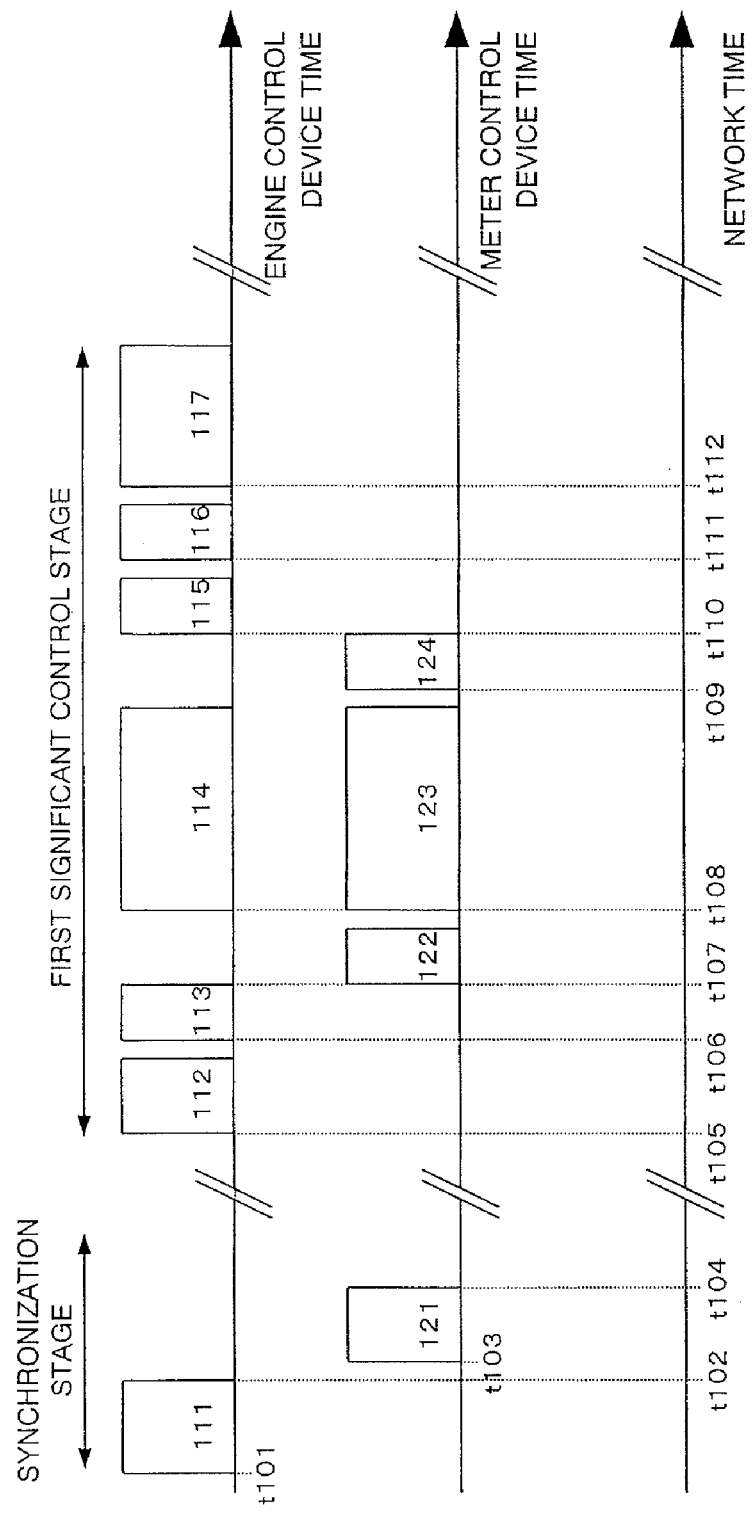
FIG. 11 is a timing chart illustrating an operation of the control system according the third embodiment of the present invention.

In FIG. 11, the horizontal axes represent engine control device time, which indicates the flow of time in the engine control device 20, meter control device time, which indicates the flow of time in the meter control device 30, and network time, which indicates the flow of time in the network 10.

Further, in FIG. 11, the engine control device 20 executes processing of from processing 111 to processing 117. Further, the meter control device 30 executes processing of from processing 121 to processing 124.

Here, the processing 111 and the processing 121 are processing of a synchronization stage. The processing of from the processing 112 to the processing 117 and from the processing 122 to the processing 124 is processing of a first significant control stage.

It should be noted that the processing of the synchronization stage is not executed routinely, but is executed when the engine control device time and the meter control device time need to be synchronized with the network time, such as after the boot-up or the initialization of each control device. Further, the processing of the first significant control stage is repeatedly executed every time the processing related to the first significant engine control is performed.

Next, description is given of the processing of from the processing 111 to the processing 117 performed by the engine control device 20.

In the processing 111, as initialization processing performed at the time of the boot-up of the engine control device 20, for example, the time synchronization means 28 joins the network 10 to synchronize the engine control device time with the network time.

In the processing 112, the data collection means 24 collects data necessary for calculating the control amount regarding the first significant engine control, and then causes the storage means 23 to store the collected data in the storage area for data necessary for calculation 243.

In the processing 113, the data transmission/reception means 21 transmits, to the meter control device 30, the data necessary for calculating the control amount regarding the first significant engine control.

In the processing 114, the control amount calculation means 25 calculates the control amount regarding the first significant engine control based on the data necessary for calculating the control amount regarding the first significant engine control and the control amount calculating procedure for first significant engine control 232, which are stored in the storage means 23.

In the processing 115, the data transmission/reception means 21 receives a control amount regarding the first significant engine control, which is transmitted from the meter control device 30.

In the processing 116, the comparison means 26 compares the control amount regarding the first significant engine control, which is calculated in the processing 114, and the control amount regarding the first significant engine control, which is received in the processing 115. Then, when the two control amounts have the same value, the comparison means 26 outputs the control amount regarding the first significant engine control to the engine control means 27. When the two control amounts have different values, the comparison means 26 outputs to the engine control means 27 a notification indicating that the control amounts are different.

In the processing 117, the engine control means 27 executes control of the engine unit 200 based on a result of the comparison made by the comparison means 26. Specifically, when the control amount regarding the first significant engine control has been input from the comparison means 26, the engine control means 27 executes the control of the engine unit 200 based on this control amount. When the notification indicating that the control amounts are different has been input from the comparison means 26, the engine control means 27 does not execute the control of the engine unit 200.

Next, description is given of the processing of from the processing 121 to the processing 124 performed by the meter control device 30.

In the processing 121, as initialization processing performed at the time of the boot-up of the meter control device 30, for example, the time synchronization means 38 joins the network 10 to synchronize the meter control device time with the network time.

In the processing 122, the data transmission/reception means 31 receives the data necessary for calculating the control amount regarding the first significant engine control, which is transmitted from the engine control device 20. Then, the data saving means 34 causes the storage means 33 to store the received data in the storage area for data necessary for calculation 343.

In the processing 123, the control amount calculation means 35 calculates the control amount regarding the first significant engine control based on the data necessary for calculating the control amount regarding the first significant engine control, and the control amount calculating procedure for first significant engine control 232, which are stored in the storage means 33.

In the processing 124, the data transmission/reception means 31 transmits, to the engine control device 20, the control amount regarding the first significant engine control, which is calculated in the processing 123.

It should be noted that, in the engine control device 20, after the processing 111, the engine control device time and the network time are identical due to the synchronization. Further, in the meter control device 30, after the processing 121, the meter control device time and the network time are identical due to the synchronization.

In the timing chart illustrated in FIG. 11, only the processing related to the first significant engine control is illustrated for the purpose of clarifying the features of the third embodiment. However, in actuality, not only this processing, there exist processing related to the normal engine control and processing related to the meter control in the engine control device 20 and in the meter control device 30, respectively. These processings are executed in the respective control devices during the free time in which the processing related to the first significant engine control (processing of first significant control stage of FIG. 11) is not executed.

Next, referring to the timing chart of FIG. 11, description is given of operation of the control system, which is performed in a case where there is no abnormality in both of the control amount calculation means 25 and the control amount calculation means 35, enabling the control amounts regarding the first significant engine control to be calculated accurately.

First, description is given of the processing of the synchronization stage.

First, the engine control device 20 is booted by a time point t101, and, at the time point t101, the time synchronization means 28 executes the processing 111. In the engine control device 20, after a time point t102, at which the processing 111 ends, the engine control device time and the network time are identical due to the synchronization.

Next, the meter control device 30 is booted by a time point t103, and, at the time point t103, the time synchronization means 38 executes the processing 121. In the meter control device 30, after a time point t104, at which the processing 121 ends, the meter control device time and the network time are identical due to the synchronization.

Next, description is given of the processing of the first significant control stage.

First, at a time point t105, the data collection means 24 executes the processing 112 to cause the storage means 23 to store the data necessary for calculating the control amount regarding the first significant engine control in the storage area for data necessary for calculation 243.

Next, at a time point t106, the data transmission/reception means 21 executes the processing 113 to transmit, via the network 10, the data necessary for calculating the control amount regarding the first significant engine control to the meter control device 30.

Next, at a time point t107, the data transmission/reception means 31 and the data saving means 34 execute the processing 122 to cause the storage means 33 to store, in the storage area for data necessary for calculation 343, the received data necessary for calculating the control amount regarding the first significant engine control.

Next, at a time point t108, the control amount calculation means 25 and the control amount calculation means 35 simultaneously execute the processing 114 and the processing 123, respectively. The control amount calculation means 25 and the control amount calculation means 35 calculate control amounts regarding the first significant engine control based on the control amount calculating procedure for first significant engine control 232 and the respective pieces of data necessary for calculating the control amount regarding the first significant engine control, which are stored in the storage means 23 and the storage means 33.

Next, at a time point t109, the data transmission/reception means 31 executes the processing 124 to transmit the control amount regarding the first significant engine control, which is calculated in the processing 123, to the engine control device 20 via the network 10.

Next, at a time point t110, the data transmission/reception means 21 executes the processing 115 to receive the control amount regarding the first significant engine control, which is transmitted via the network 10 from the meter control device 30.

Next, at a time point till, the comparison means 26 executes the processing 116 to compare the control amount regarding the first significant engine control, which is calculated in the processing 114, and the control amount regarding the first significant engine control, which is received in the processing 115. Here, because there is no abnormality in both of the control amount calculation means 25 and the control amount calculation means 35, the control amounts regarding the first significant engine control have the same value. Accordingly, the comparison means 26 outputs the control amount regarding the first significant engine control to the engine control means 27.

Next, at a time point t112, the engine control means 27 executes the processing 117 to execute the control of the engine unit 200 based on the control amount regarding the first significant engine control, which has been input from the comparison means 26.

Next, referring to the timing chart of FIG. 11, description is given of operation of the control system, which is performed in a case where there is an abnormality in any one of the control amount calculation means 25 and the control amount calculation means 35.

It should be noted that because the processing of the synchronization stage and the processing from the time point t105 to the time point t107 of the first significant control stage are the same as the above-mentioned processing performed in a case where there is no abnormality in the control amount calculation means 25 and the control amount calculation means 35, description thereof is omitted.

First, at the time point t108, the control amount calculation means 25 and the control amount calculation means 35 simultaneously execute the processing 114 and the processing 123, respectively. The control amount calculation means 25 calculates the control amount regarding the first significant engine control based on the data necessary for calculating the control amount regarding the first significant engine control and the control amount calculating procedure for first significant engine control 232, which are stored in the storage means 23. Here, for example, if there is an abnormality in the control amount calculation means 25, the calculated control amount regarding the first significant engine control has a different value from the control amount that is to be obtained originally.

On the other hand, the control amount calculation means 35 calculates the control amount regarding the first significant engine control based on the data necessary for calculating the control amount regarding the first significant engine control and the control amount calculating procedure for first significant engine control 232, which are stored in the storage means 33.

It should be noted that the processing of the time point t109 and the time point t110 of the first significant control stage are also the same as the above-mentioned processing performed in a case where there is no abnormality in the control amount calculation means 25 and the control amount calculation means 35, and hence description thereof is omitted.

Next, at the time point t111, the comparison means 26 executes the processing 116 to compare the control amount regarding the first significant engine control, which is calculated in the processing 114, and the control amount regarding the first significant engine control, which is received in the processing 115. Here, because there is an abnormality in the control amount calculation means 25, the control amounts regarding the first significant engine control have different values. Accordingly, the comparison means 26 outputs to the engine control means 27 the notification indicating that the control amounts are different.

Next, at the time point t112, the engine control means 27 executes the processing 117. However, due to input of the notification indicating that the control amounts are different from the comparison means 26, the engine control means 27 does not execute the control of the engine unit 200.

In this manner, by comparing and examining is made between the control amount regarding the first significant engine control, which is calculated by the control amount calculation means 25, and the control amount regarding the first significant engine control, which is calculated by the control amount calculation means 35, it is possible to detect whether or not there is an abnormality in any one of the control amount calculation means 25 and the control amount calculation means 35.

Specifically, by comparing the control amount regarding the first significant engine control, which is calculated by the control amount calculation means 25, and the control amount regarding the first significant engine control, which is calculated by the control amount calculation means 35, and, when the two control amounts have the same value, executing the control of the engine unit 200 based on that control amount regarding the first significant engine control, it is possible to reduce the cost of the control system while securing reliability of the control without providing two microcomputers or a monitoring circuit within the engine control device 20.

Further, while the control amount regarding the first significant engine control is being calculated in the engine control device 20 (original calculation), the corresponding control amount is calculated by the control amount calculation means 35 of the meter control device 30 simultaneously, to thereby compare results of the calculations. Then, when both of the control amounts have the same value, the control of the engine unit 200 is executed based on the control amounts regarding the first significant engine control. As a result, at the time of carrying out not the calculation for the abnormality detection but the original calculation, it is possible to judge whether or not there is an abnormality, thereby securing the reliability of the control.

As described above, according to the third embodiment, there are provided a first control device and a second control device, which are connected to a network in which time synchronization is possible between nodes connected thereto. The first control device includes: first control amount calculation means for calculating a control amount regarding a first significant control based on a first control amount calculating procedure for calculating the control amount regarding the first significant control, and data for first control necessary for calculating the control amount regarding the first significant control for a control target of the first control device; comparison means for comparing the control amount regarding the first significant control, which is calculated by the first control amount calculation means, and the control amount regarding the first significant control, which is calculated by the second control device; and control means for controlling the control target based on a result of the comparison made by the comparison means. The second control device includes second storage means for storing the first control amount calculating procedure and the data for first control, which is received from the first control device via the network, and second control amount calculation means for calculating the control amount regarding the first significant control based on the first control amount calculating procedure and the data for first control.

Therefore, without providing two microcomputers having the same functions or a monitoring circuit within the control device, by comparing and examining the control amount regarding the first significant control, which is calculated by the first control amount calculation means, and the control amount regarding the first significant control, which is calculated by the second control device, it is possible to obtain a control system capable of reducing the cost while securing the reliability of the control.

Further, when the comparison means judges that all of the compared control amounts regarding the first significant control have the same values, the control means controls the control target based on the control amounts regarding the first significant control having the same value. When the comparison means judges that not all of the compared control amounts regarding the first significant control have the same values, the control means does not control the control target. Therefore, the reliability of the control can be improved.

Here, in the third embodiment described above, there has been given the description in which, when the notification indicating that the control amounts are different has been input from the comparison means 26, the engine control means 27 does not execute the control of the engine unit 200. However, the present invention is not limited thereto. When the notification indicating that the control amounts are different has been input from the comparison means 26, the engine control means 27 may execute the control of the engine unit 200 based on a predetermined control amount previously set as a control amount regarding the first significant engine control. Further, instead of the predetermined control amount, the engine control means 27 may use the control amount calculated last time.

In this case, even if an abnormality has occurred in any one of the control amount calculation means 25 and the control amount calculation means 35, it is possible to continue the control without stopping the engine.

Further, in the third embodiment described above, the control amount calculation means 25 and the control amount calculation means 35 may have an identical configuration by, for example, using microcomputers of the same model number from the same manufacturer.

In this case, the control amounts can be calculated more accurately. In addition, by executing the control of the engine unit 200 based on a result obtained through comparison between such control amounts, it is possible to improve the reliability of the control.

Further, in the third embodiment described above, the storage means 23 and the storage means 33 may have an identical configuration by, for example, using memories of the same model number from the same manufacturer. Then, the control amount calculating procedure for first significant engine control 232 may be stored at the same location of each of the memories.

In this case, the control amounts can be calculated more accurately. In addition, by executing the control of the engine unit 200 based on a result obtained through comparison among such control amounts, it is possible to improve the reliability of the control.

Further, in the third embodiment described above, the storage means 23 and the storage means 33 may have an identical configuration by, for example, using memories of the same model number from the same manufacturer. Then, the storage area for data necessary for calculation 243 and the storage area for data necessary for calculation 343, in which data necessary for calculating a control amount regarding the first significant engine control is stored, may be located at the same location of each of the memories.

In this case, the control amounts can be calculated more accurately. In addition, by executing the control of the engine unit 200 based on a result obtained through comparison among such control amounts, it is possible to improve the reliability of the control.

Further, in the third embodiment described above, there has been given the description of the case where an abnormality occurs in the control amount calculation means 25. According to the third embodiment, even if unintended data change, data corruption, or the like has occurred after the data necessary for calculating a control amount regarding the first significant engine control is transmitted to the meter control device 30 by the data transmission/reception means 21, it is possible to improve the reliability of the control by executing the control of the engine unit 200 based on a result obtained through comparison among the calculated control amounts.

Fourth Embodiment

In the third embodiment described above, two control devices, which are the engine control device 20 and the meter control device 30, calculate control amounts regarding the first significant engine control to compare the calculated control amounts. However, the present invention is not limited thereto. Three or more control devices may each calculate a control amount regarding a significant control to compare the calculated control amounts.

Hereinbelow, description is given by taking as an example a case where three control devices each calculate a control amount regarding a significant control to compare the calculated control amounts.

Figure 12:
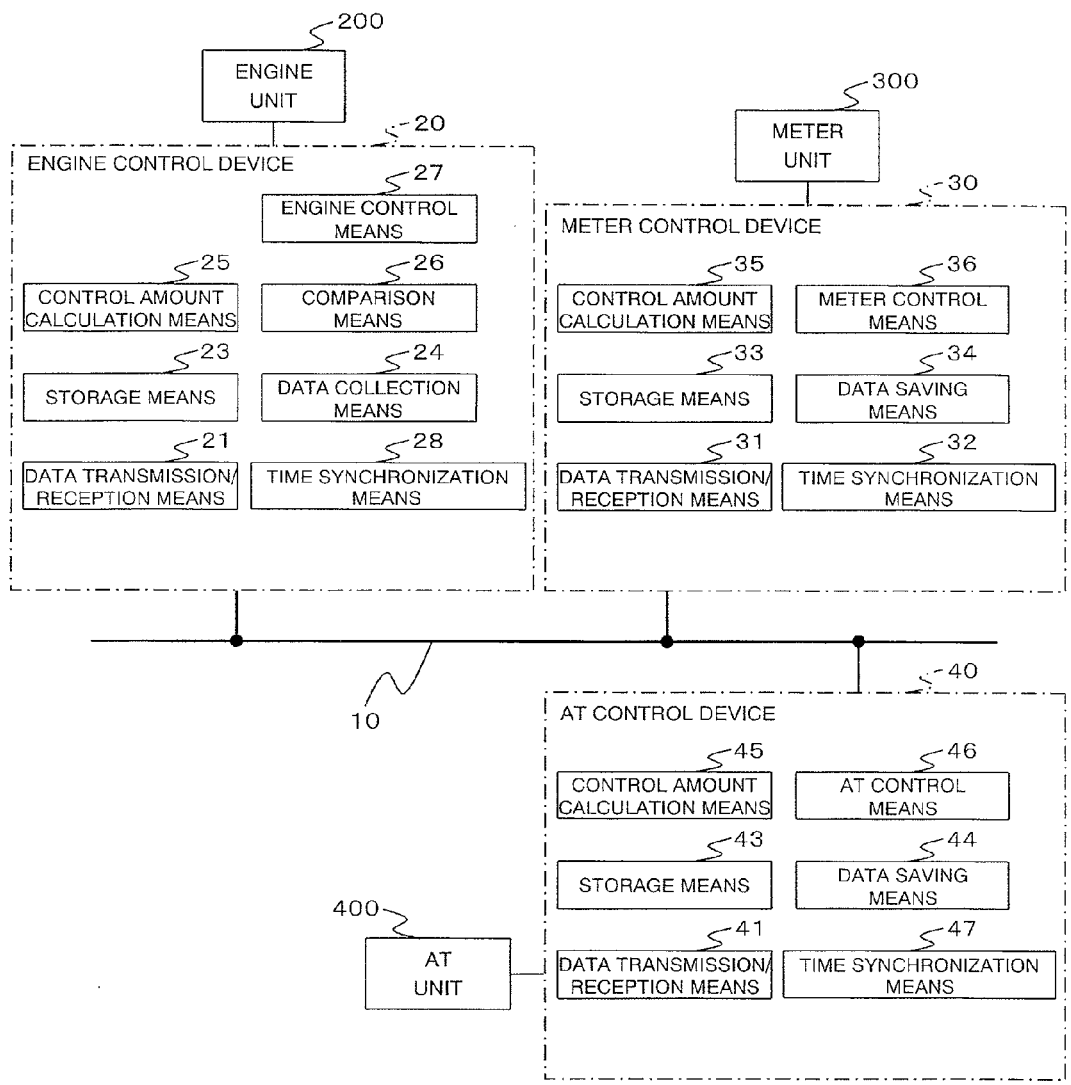
FIG. 12 is a block configuration diagram illustrating a control system according to a fourth embodiment of the present invention.

FIG. 12 is a block configuration diagram illustrating a control system according to a fourth embodiment of the present invention.

In FIG. 12, in addition to the control system illustrated in FIG. 10, the control system according to the fourth embodiment includes an automatic transmission (AT) control device 40 (third control device) connected to the network 10. Further, the AT control device 40 is connected to an AT unit 400, which is a control target.

Next, description is given of a configuration and functions of the AT control device 40.

The AT control device 40 includes data transmission/reception means 41, time synchronization means 47 (third time synchronization means), storage means 43 (third storage means), data saving means 44, control amount calculation means 45 (third control amount calculation means), and AT control means 46. Further, the control amount calculation means 45 is configured by a microcomputer.

Further, apart from the above-mentioned means, the AT control device 40 includes other necessary components. However, those components do not have direct relevance to the fourth embodiment, and hence description thereof is omitted.

The data transmission/reception means 41 transmits and receives data to and from, via the network 10, other control devices (including the engine control device 20 and the meter control device 30) connected to the network 10. The time synchronization means 47 executes time synchronization between control devices connected to the network 10. The storage means 43 stores various pieces of data, which are described below.

The data saving means 44 causes the storage means 43 to store data necessary for calculating a control amount regarding a first significant engine control, which is received from the engine control device 20. The control amount calculation means 45 calculates control amounts necessary for the AT control and the engine control based on a processing procedure described below. The AT control means 46 executes control of the AT unit 400 based on the calculated control amount.

Figure 13:
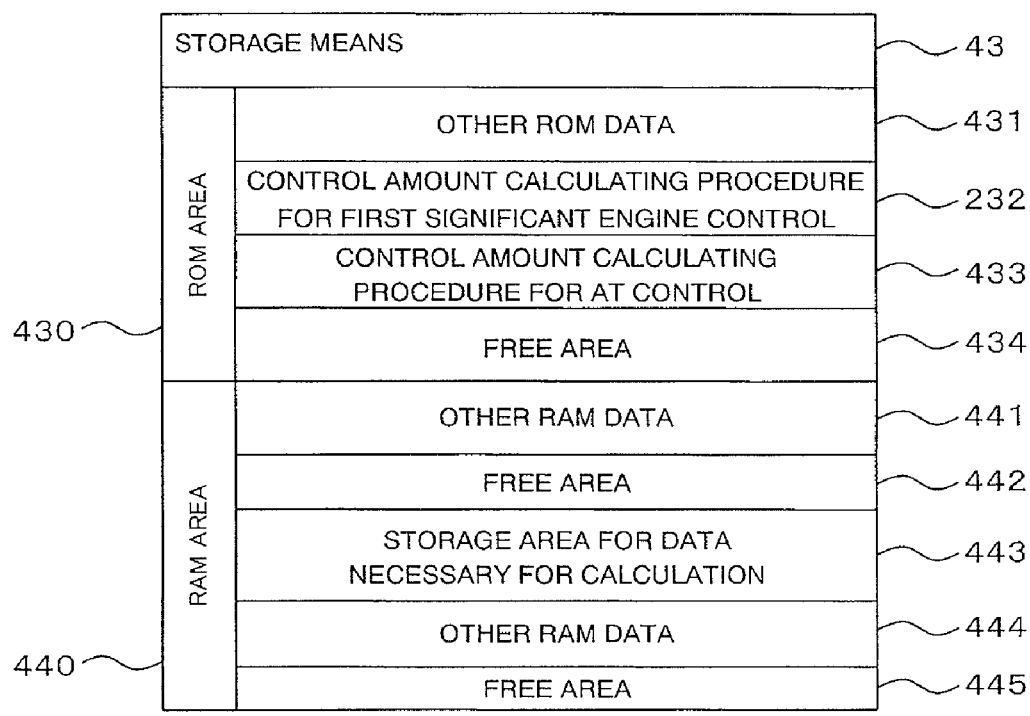
FIG. 13 is an explanatory diagram illustrating in detail storage means of an AT control device of FIG. 12.

Next, referring to FIG. 13, detailed description is given of the storage means 43 of the AT control device 40.

In FIG. 13, the storage means 43 is divided into a ROM area 430 in which no other data can be stored apart from previously-stored data and a RAM area 440 in which data can be stored.

The ROM area 430 contains other ROM data 431, a control amount calculating procedure for first significant engine control 232, a control amount calculating procedure for AT control 433, and a free area 434.

Here, the other ROM data 431 and the free area 434 have no direct relevance to the fourth embodiment, and hence description thereof is omitted.

The control amount calculating procedure for first significant engine control 232 indicates a procedure for calculating a control amount regarding the first significant engine control, and the storage means 23, the storage means 33, and the storage means 43 each store the same control amount calculating procedure for first significant engine control 232. The control amount calculating procedure for AT control 433 indicates a procedure for calculating a control amount regarding the AT control.

Further, the RAM area 440 contains other RAM data 441, a free area 442, a storage area for data necessary for calculation 443, other RAM data 444, and a free area 445.

Here, the other RAM data 441, the free area 442, the other RAM data 444, and the free area 445 have no direct relevance to the fourth embodiment, and hence description thereof is omitted.

The storage area for data necessary for calculation 443 is an area in which data necessary for calculating a control amount regarding the first significant engine control is stored.

It should be noted that, in FIG. 12, the data transmission/reception means 21, the data transmission/reception means 31, and the data transmission/reception means 41 may be identical to one another. Similarly, in FIG. 12, the time synchronization means 28, the time synchronization means 38 and the time synchronization means 47 may be identical to each other.

Further, the rest of the configuration and the functions are the same as in the third embodiment, and hence description thereof is omitted.

Hereinbelow, referring to a timing chart of FIG. 14, description is given of operation of the control system according to the fourth embodiment of the present invention. Here, description is given of processing related to the first significant engine control.

Figure 14:
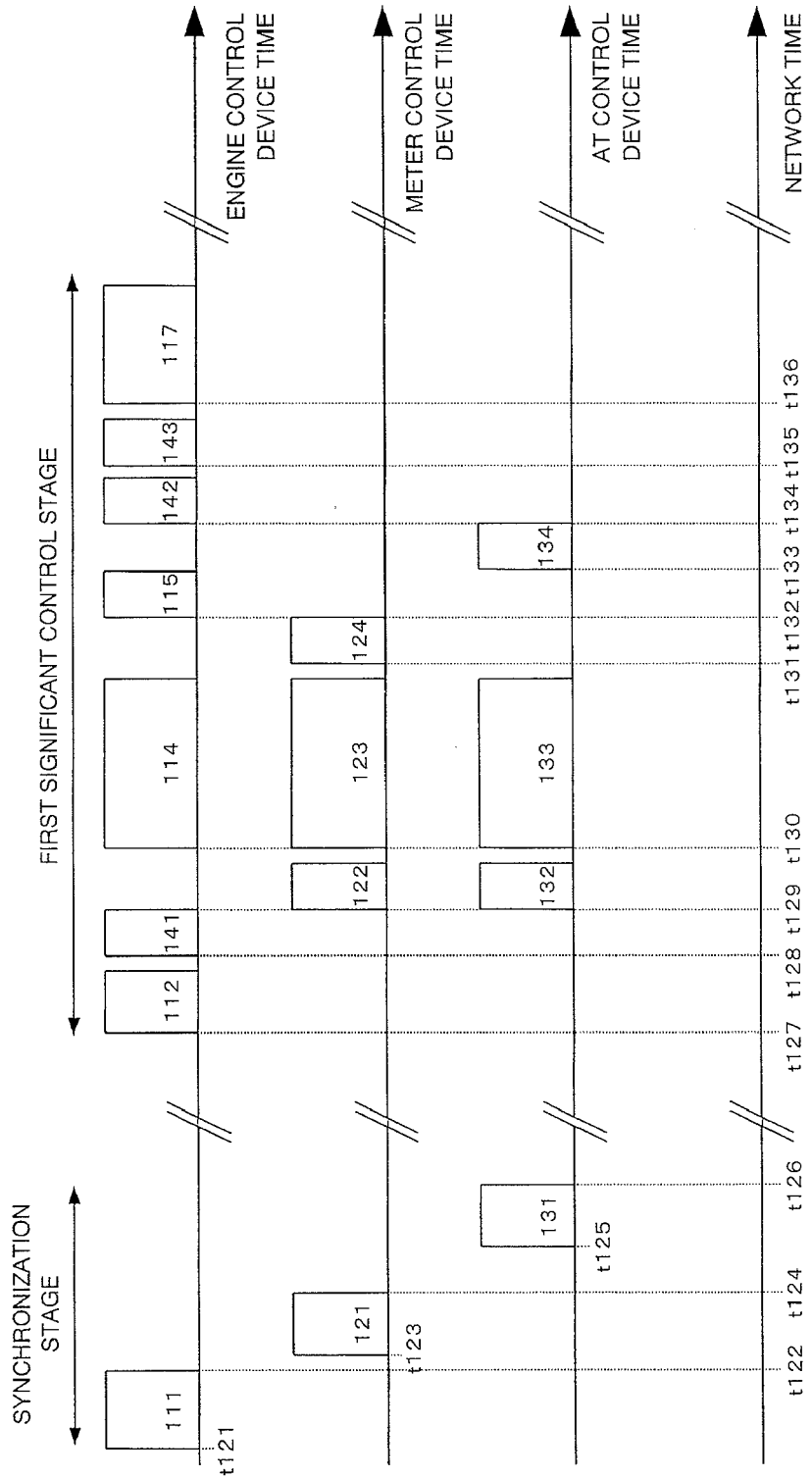
FIG. 14 is a timing chart illustrating an operation of the control system according to the fourth embodiment of the present invention.

In FIG. 14, the horizontal axes represent engine control device time, which indicates the flow of time in the engine control device 20, meter control device time, which indicates the flow of time in the meter control device 30, AT control device time, which indicates the flow of time in the AT control device 40, and network time, which indicates the flow of time in the network 10.

Further, in FIG. 14, the AT control device 40 executes processing of from processing 131 to processing 134. Further, the engine control device 20 executes processing 141 instead of the processing 113 illustrated in FIG. 11, and executes processing 142 and processing 143 instead of the processing 116.

Here, the rest of the processing is the same as in the third embodiment, and hence description thereof is omitted.

Here, the processing 111, the processing 121, and the processing 131 are the processing of the synchronization stage, whereas the processing of from the processing 112 to the processing 117, from the processing 122 to the processing 124, and from the processing 132 to the processing 134 is the processing of the first significant control stage.

It should be noted that the processing of the synchronization stage is not executed routinely, but is executed when the engine control device time, the meter control device time, and the AT control device time need to be synchronized with the network time, such as after the boot-up or the initialization of each control device. Further, the processing of the first significant control stage is repeatedly executed every time the processing related to the first significant engine control is performed.

Next, description is given of the processing of from the processing 131 to the processing 134 performed by the AT control device 40.

In the processing 131, as initialization processing performed at the time of the boot-up of the AT control device 40, for example, the time synchronization means 47 joins the network 10 to synchronize the AT control device time with the network time.

In the processing 132, the data transmission/reception means 41 receives the data necessary for calculating the control amount regarding the first significant engine control, which is transmitted from the engine control device 20. Then, the data saving means 44 causes the storage means 43 to store the received data in the storage area for data necessary for calculation 443.

In the processing 133, the control amount calculation means 45 calculates the control amount regarding the first significant engine control based on the data necessary for calculating the control amount regarding the first significant engine control, and the control amount calculating procedure for first significant engine control 232, which are stored in the storage means 43.

In the processing 134, the data transmission/reception means 41 transmits, to the engine control device 20, the control amount regarding the first significant engine control, which is calculated in the processing 133.

Next, description is given of the processing of from the processing 141 to the processing 143 performed by the engine control device 20.

In the processing 141, the data transmission/reception means 21 transmits, to the meter control device 30 and the AT control device 40, the data necessary for calculating the control amount regarding the first significant engine control.

In the processing 142, the data transmission/reception means 21 receives the control amount regarding the first significant engine control, which is transmitted from the AT control device 40.

In the processing 143, the comparison means 26 compares the control amount regarding the first significant engine control, which is calculated in the processing 114, and the control amounts regarding the first significant engine control, which are received in the processing 115 and the processing 142, respectively. Specifically, when all the control amounts have the same value, the comparison means 26 outputs the control amount regarding the first significant engine control to the engine control means 27. When two of the control amounts have the same value, the comparison means 26 outputs to the engine control means 27 the control amount regarding the first significant engine control, which represents the two same control amounts. When all the control amounts have different values, the comparison means 26 outputs to the engine control means 27 a notification indicating that the control amounts are different.

It should be noted that, in the engine control device 20, after the processing 111, the engine control device time and the network time are identical due to the synchronization. Further, in the meter control device 30, after the processing 121, the meter control device time and the network time are identical due to the synchronization. Further, in the AT control device 40, after the processing 131, the AT control device time and the network time are identical due to the synchronization.

In the timing chart illustrated in FIG. 14, only the processing related to the first significant engine control is illustrated for the purpose of clarifying the features of the fourth embodiment. However, in actuality, not only this processing, there exist processing related to the normal engine control, processing related to the meter control, and processing related to the AT control in the engine control device 20, in the meter control device 30, and in the AT control device 40, respectively. These processings are executed in the respective control devices during the free time in which the processing related to the first significant engine control (processing of the first significant control stage of FIG. 14) is not executed.

Next, referring to the timing chart of FIG. 14, description is given of operation of the control system, which is performed in a case where there is no abnormality in the control amount calculation means 25, the control amount calculation means 35, and the control amount calculation means 45, enabling the control amount regarding the first significant engine control to be calculated accurately.

First, description is given of the processing of the synchronization stage.

First, the engine control device 20 is booted by a time point t121, and, at the time point t121, the time synchronization means 28 executes the processing 111. In the engine control device 20, after a time point t122, at which the processing 111 ends, the engine control device time and the network time are identical due to the synchronization.

Next, the meter control device 30 is booted by a time point t123, and, at the time point t123, the time synchronization means 38 executes the processing 121. In the meter control device 30, after a time point t124, at which the processing 121 ends, the meter control device time and the network time are identical due to the synchronization.

Next, the AT control device 40 is booted by a time point t125, and, at the time point t125, the time synchronization means 47 executes the processing 131. In the AT control device 40, after a time point t126, at which the processing 131 ends, the AT control device time and the network time are identical due to the synchronization.

Next, description is given of the processing of the first significant control stage.

First, at a time point t127, the data collection means 24 executes the processing 112 to cause the storage means 23 to store the data necessary for calculating the control amount regarding the first significant engine control in the storage area for data necessary for calculation 243.

Next, at a time point t128, the data transmission/reception means 21 executes the processing 141 to transmit, via the network 10, the data necessary for calculating the control amount regarding the first significant engine control to the meter control device 30 and the AT control device 40.

Next, at a time point t129, the data transmission/reception means 31 and the data saving means 34 execute the processing 122, and, at the same time, the data transmission/reception means 41 and the data saving means 44 execute the processing 132. The data transmission/reception means 31 and the data saving means 34 cause the storage means 33 to store the received data necessary for calculating the control amount regarding the first significant engine control in the storage area for data necessary for calculation 343. Further, the data transmission/reception means 41 and the data saving means 44 cause the storage means 43 to store the received data necessary for calculating the control amount regarding the first significant engine control in the storage area for data necessary for calculation 443.

Next, at a time point t130, the control amount calculation means 25, the control amount calculation means 35, and the control amount calculation means 45 simultaneously execute the processing 114, the processing 123, and the processing 133, respectively. The control amount calculation means 25 calculates the control amount regarding the first significant engine control based on the data necessary for calculating the control amount regarding the first significant engine control and the control amount calculating procedure for first significant engine control 232, which are stored in the storage means 23. Further, the control amount calculation means 35 calculates the control amount regarding the first significant engine control based on the data necessary for calculating the control amount regarding the first significant engine control and the control amount calculating procedure for first significant engine control 232, which are stored in the storage means 33. Further, the control amount calculation means 45 calculates the control amount regarding the first significant engine control based on the data necessary for calculating the control amount regarding the first significant engine control and the control amount calculating procedure for first significant engine control 232, which are stored in the storage means 43.

Next, at a time point t131, the data transmission/reception means 31 executes the processing 124 to transmit the control amount regarding the first significant engine control, which is calculated in the processing 123, to the engine control device 20 via the network 10.

Next, at a time point t132, the data transmission/reception means 21 executes the processing 115 to receive the control amount regarding the first significant engine control, which is transmitted via the network 10 from the meter control device 30.

Next, at a time point t133, the data transmission/reception means 41 executes the processing 134 to transmit the control amount regarding the first significant engine control, which is calculated in the processing 133, to the engine control device 20 via the network 10.

Next, at a time point t134, the data transmission/reception means 21 executes the processing 142 to receive the control amount regarding the first significant engine control, which is transmitted via the network 10 from the AT control device 40.

Next, at a time point t135, the comparison means 26 executes the processing 143 to compare the control amount regarding the first significant engine control, which is calculated in the processing 114, and the control amounts regarding the first significant engine control, which are received in the processing 115 and the processing 142. Here, because there is no abnormality in any of the control amount calculation means 25, the control amount calculation means 35, and the control amount calculation means 45, the control amounts regarding the first significant engine control have the same value. Accordingly, the comparison means 26 outputs the control amount regarding the first significant engine control to the engine control means 27.

Next, at a time point t136, the engine control means 27 executes the processing 117 to execute the control of the engine unit 200 based on the control amount regarding the first significant engine control, which has been input from the comparison means 26.

Next, referring to the timing chart of FIG. 14, description is given of operation of the control system, which is performed in a case where there is an abnormality in any one of the control amount calculation means 25, the control amount calculation means 35, and the control amount calculation means 45.

It should be noted that because the processing of the synchronization stage and the processing from the time point t127 to the time point t129 of the first significant control stage are the same as the above-mentioned processing performed in a case where there is no abnormality in the control amount calculation means 25, the control amount calculation means 35, and the control amount calculation means 45, description thereof is omitted.

First, at the time point t130, the control amount calculation means 25, the control amount calculation means 35, and the control amount calculation means 45 simultaneously execute the processing 114, the processing 123, and the processing 133, respectively. The control amount calculation means 25 calculates the control amount regarding the first significant engine control based on the data necessary for calculating the control amount regarding the first significant engine control and the control amount calculating procedure for first significant engine control 232, which are stored in the storage means 23. Here, if there is an abnormality in the control amount calculation means 25, for example, the calculated control amount regarding the first significant engine control has a different value from the control amount that is to be obtained originally.

Further, the control amount calculation means 35 calculates the control amount regarding the first significant engine control based on the data necessary for calculating the control amount regarding the first significant engine control and the control amount calculating procedure for first significant engine control 232, which are stored in the storage means 33. Further, the control amount calculation means 45 calculates the control amount regarding the first significant engine control based on the data necessary for calculating the control amount regarding the first significant engine control and the control amount calculating procedure for first significant engine control 232, which are stored in the storage means 43.

It should be noted that the processing from the time point t131 to the time point t134 of the first significant control stage is also the same as the above-mentioned processing performed in a case where there is no abnormality in the control amount calculation means 25, the control amount calculation means 35, and the control amount calculation means 45, and hence description thereof is omitted.

Next, at the time point t135, the comparison means 26 executes the processing 143 to compare the control amount regarding the first significant engine control, which is calculated in the processing 114, and the control amounts regarding the first significant engine control, which are received in the processing 115 and the processing 142. Here, because there is an abnormality in the control amount calculation means 25, the control amount regarding the first significant engine control, which is calculated by the control amount calculation means 25, has a different value from the control amounts regarding the first significant engine control, which are calculated by the control amount calculation means 35 and the control amount calculation means 45.

However, because there is no abnormality in the control amount calculation means 35 and the control amount calculation means 45, the control amounts regarding the first significant engine control, which are calculated by the control amount calculation means 35 and the control amount calculation means 45, have the same value. Accordingly, the comparison means 26 outputs to the engine control means 27 the control amount regarding the first significant engine control, which is calculated by each of the control amount calculation means 35 and the control amount calculation means 45.

It should be noted that in a case where there is an abnormality in at least two of the control amount calculation means 25, the control amount calculation means 35, and the control amount calculation means 45, and all the control amounts regarding the first significant engine control are different, the comparison means 26 outputs to the engine control means 27 a notification indicating that the control amounts are different.

Next, at the time point t136, the engine control means 27 executes the processing 117 to execute the control of the engine unit 200 based on the control amount regarding the first significant engine control, which is calculated by each of the control amount calculation means 35 and the control amount calculation means 45, and is then input from the comparison means 26.

In this manner, by comparing and examining the control amount regarding the first significant engine control, which is calculated by the control amount calculation means 25, the control amount regarding the first significant engine control, which is calculated by the control amount calculation means 35, and the control amount regarding the first significant engine control, which is calculated by the control amount calculation means 45, it is possible to detect whether or not there is an abnormality in any one of the control amount calculation means 25, the control amount calculation means 35, and the control amount calculation means 45.

Specifically, by comparing the control amount regarding the first significant engine control, which is calculated by the control amount calculation means 25, the control amount regarding the first significant engine control, which is calculated by the control amount calculation means 35, and the control amount regarding the first significant engine control, which is calculated by the control amount calculation means 45, the control of the engine unit 200 is executed as follows. When all the control amounts have the same value, the control of the engine unit 200 is executed based on this control amount regarding the first significant engine control. When two of the control amounts have the same value, the control of the engine unit 200 is executed based on the control amount regarding the first significant engine control, which represents the two same control amounts. As a result, it is possible to reduce the cost of the control system while securing the reliability of the control without providing two microcomputers or a monitoring circuit within the engine control device 20.

Further, while the control amount regarding the first significant engine control is being calculated in the engine control device 20 (original calculation), the corresponding control amounts are simultaneously calculated by the control amount calculation means 35 of the meter control device 30 and the control amount calculation means 45 of the AT control device 40, to thereby compare results of the calculations. Then, when all the control amounts or two of the control amounts have the same value, the control of the engine unit 200 is executed based on the control amount regarding the first significant engine control, which represents the same value. As a result, at the time of carrying out not the calculation for the abnormality detection but the original calculation, it is possible to judge whether or not there is an abnormality, thereby securing the reliability of the control.

As described above, according to the fourth embodiment, there are provided a first control device, a second control device, and a third control device, which are connected to a network in which time synchronization is possible between nodes connected thereto. The first control device includes: first control amount calculation means for calculating a control amount regarding a first significant control based on a first control amount calculating procedure for calculating the control amount regarding the first significant control, and data for first control necessary for calculating the control amount regarding the first significant control for a control target of the first control device; comparison means for comparing the control amount regarding the first significant control, which is calculated by the first control amount calculation means, a control amount regarding the first significant control, which is calculated by the second control device, and a control amount regarding the first significant control, which is calculated by the third control device; and control means for controlling the control target based on a result of the comparison made by the comparison means. The second control device includes second storage means for storing the first control amount calculating procedure and the data for first control, which is received from the first control device via the network, and second control amount calculation means for calculating the control amount regarding the first significant control based on the first control amount calculating procedure and the data for first control. The third control device includes third storage means for storing the first control amount calculating procedure and the data for first control, which is received from the first control device via the network, and third control amount calculation means for calculating the control amount regarding the first significant control based on the first control amount calculating procedure and the data for first control.

Therefore, without providing two microcomputers having the same functions or a monitoring circuit within the control device, by comparing and examining the control amount regarding the first significant control, which is calculated by the first control amount calculation means, the control amount regarding the first significant control, which is calculated by the second control device, and the control amount regarding the first significant control, which is calculated by the third control device, it is possible to obtain a control system capable of reducing the cost while securing the reliability of the control.

Further, when the comparison means judges that all the compared control amounts regarding the first significant control have the same value, the control means controls the control target based on the control amount regarding the first significant control, which represents the same value. When the comparison means judges that all the compared control amounts regarding the first significant control have different values, the control means does not control the control target. Further, when the comparison means judges that not all of the compared control amounts regarding the first significant control have the same value but two of the control amounts have the same value, the control means controls the control target based on the control amount regarding the first significant control, which represents the same value. Therefore, the reliability of the control can be improved.

Here, in the fourth embodiment described above, there has been given the description in which, when the notification indicating that the control amounts are different has been input from the comparison means 26, the engine control means 27 does not execute the control of the engine unit 200. However, the present invention is not limited thereto. When the notification indicating that the control amounts are different has been input from the comparison means 26, the engine control means 27 may execute the control of the engine unit 200 based on a predetermined control amount previously set as a control amount regarding the first significant engine control. Further, instead of the predetermined control amount that is set previously, the engine control means 27 may use the control amount calculated last time.

In this case, even if an abnormality has occurred in any one of the control amount calculation means 25, the control amount calculation means 35, and the control amount calculation means 45, it is possible to continue the control without stopping the engine.

Further, in the fourth embodiment described above, the control amount calculation means 25, the control amount calculation means 35, and the control amount calculation means 45 may have an identical configuration by, for example, using microcomputers of the same model number from the same manufacturer.

In this case, the control amounts can be calculated more accurately. In addition, by executing the control of the engine unit 200 based on results obtained through comparison among such control amounts, it is possible to improve the reliability of the control.

Further, in the fourth embodiment described above, the storage means 23, the storage means 33, and the storage means 43 may have an identical configuration by, for example, using memories of the same model number from the same manufacturer. Then, the control amount calculating procedure for first significant engine control 232 may be stored at the same location of each of the memories.

In this case, the control amounts can be calculated more accurately. In addition, by executing the control of the engine unit 200 based on results obtained through comparison among such control amounts, it is possible to improve the reliability of the control.

Further, in the fourth embodiment described above, the storage means 23, the storage means 33, and the storage means 43 may have an identical configuration by, for example, using memories of the same model number from the same manufacturer. Then, the storage area for data necessary for calculation 243, the storage area for data necessary for calculation 343, and the storage area for data necessary for calculation 443, in which data necessary for calculating a control amount regarding the first significant engine control is stored, may be located at the same location of each of the memories.

In this case, the control amounts can be calculated more accurately. In addition, by executing the control of the engine unit 200 based on results obtained through comparison among such control amounts, it is possible to improve the reliability of the control.

Further, in the fourth embodiment described above, there has been given the description of the case where an abnormality occurs in the control amount calculation means 25. According to the fourth embodiment, even if unintended data change, data corruption, or the like has occurred after the data necessary for calculating a control amount regarding the first significant engine control is transmitted to the meter control device 30 or the AT control device 40 by the data transmission/reception means 21, it is possible to improve the reliability of the control by executing the control of the engine unit 200 based on results obtained through comparison among the calculated control amounts.

Fifth Embodiment

In the third and fourth embodiment described above, two or more control devices calculate control amounts regarding the first significant engine control to compare the calculated control amounts. However, the present invention is not limited thereto. Two or more control devices may each calculate control amounts regarding two or more significant controls to compare the calculated control amounts.

The node configuration of the control system according to the fifth embodiment of the present invention is the same as in FIG. 12 of the fourth embodiment, and hence description thereof is omitted.

Here, referring to FIG. 7, detailed description is given of the storage means 23 of the engine control device 20. It should be noted that description of the same configuration as in FIG. 2 of the third embodiment is omitted.

In FIG. 7, the ROM area 230 of the storage means 23 contains the other ROM data 231, the control amount calculating procedure for first significant engine control 232, the control amount calculating procedure for normal engine control 233, and a control amount calculating procedure for second significant engine control 235 (second control amount calculating procedure).

The control amount calculating procedure for second significant engine control 235 indicates a procedure for calculating a control amount regarding the second significant engine control (second significant control), and indicates a procedure that is different from the procedure indicated by the control amount calculating procedure for first significant engine control 232.

Here, the second significant engine control refers to such control that may endanger the vehicle, the driver, the surroundings of the vehicle, etc. depending on a calculation result, and therefore refers to such control that requires high reliability.

Next, referring to FIG. 8, detailed description is given of the storage means 43 of the AT control device 40. It should be noted that description of the same configuration as in FIG. 13 of the fourth embodiment is omitted.

In FIG. 8, the ROM area 430 of the storage means 43 contains other ROM data 431, a control amount calculating procedure for AT control 433, a free area 434, and a control amount calculating procedure for second significant engine control 235.

The control amount calculating procedure for second significant engine control 235 indicates a procedure for calculating a control amount regarding the second significant engine control, and the storage means 23 and the storage means 43 each store the same control amount calculating procedure for second significant engine control 235.

Hereinbelow, referring to a timing chart of FIG. 15, description is given of operation of the control system according to the fifth embodiment of the present invention. Here, description is given of processing related to the first significant engine control and the second significant engine control.

Figure 15:
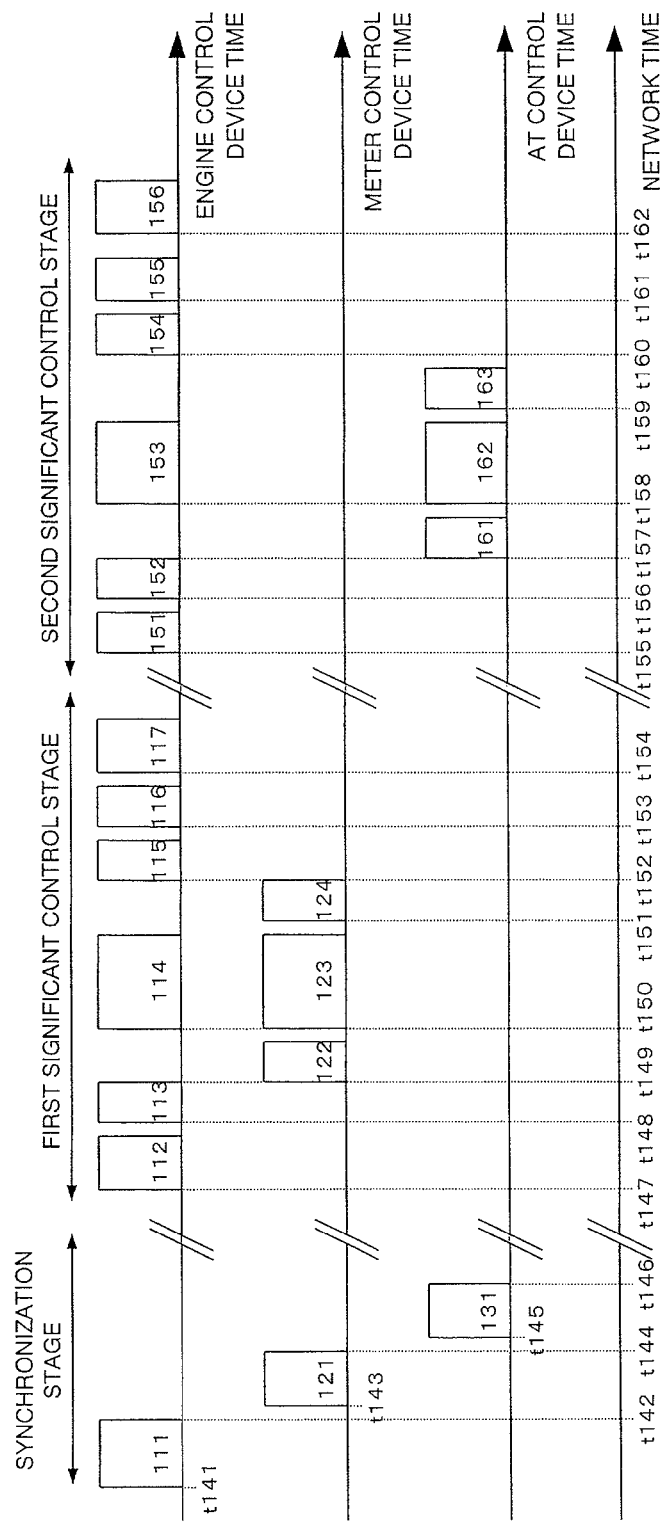
FIG. 15 is a timing chart illustrating an operation of the control system according to a fifth embodiment of the present invention.
Figure 16:
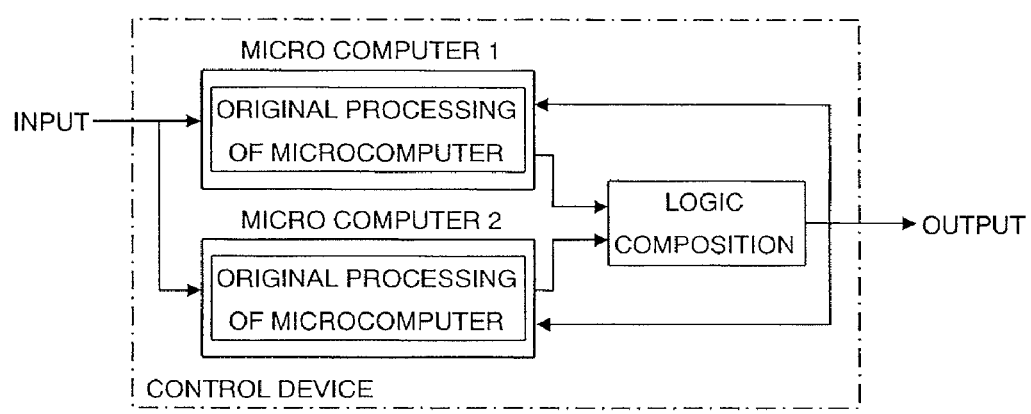
FIG. 16 is a block configuration diagram illustrating a conventional control device.
Figure 17:
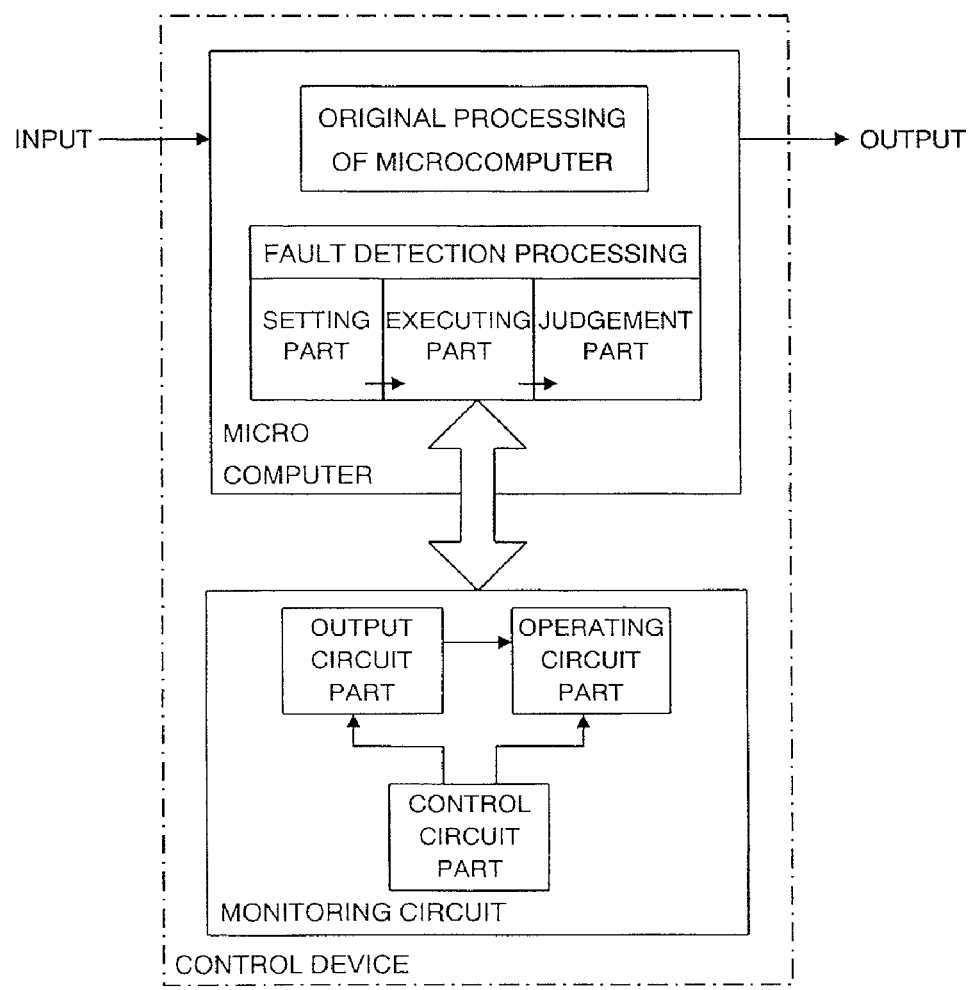
FIG. 17 is another block configuration diagram illustrating a conventional control device.

In FIG. 15, the horizontal axes represent engine control device time, which indicates the flow of time in the engine control device 20, meter control device time, which indicates the flow of time in the meter control device 30, AT control device time, which indicates the flow of time in the AT control device 40, and network time, which indicates the flow of time in the network 10.

Further, in FIG. 15, the engine control device 20 executes, in addition to the processing of from the processing 111 to the processing 117 illustrated in FIG. 11, processing of from processing 151 to processing 156. Further, the AT control device 40 executes, instead of the processing of from the processing 132 to the processing 134 illustrated in FIG. 14, processing of from processing 161 to processing 163.

Here, the rest of the processing is the same as in the third or fourth embodiment, and hence description thereof is omitted.

Here, the processing 111, the processing 121, and the processing 131 are the processing of the synchronization stage. The processing of from the processing 112 to the processing 117, and from the processing 122 to the processing 124 is processing of the first significant control stage. On the other hand, the processing of from the processing 151 to the processing 156, and from the processing 161 to the processing 163 is processing of a second significant control stage.

It should be noted that the processing of the synchronization stage is not executed routinely, but is executed when the engine control device time, the meter control device time, and the AT control device time need to be synchronized with the network time, such as after the boot-up or the initialization of each control device. Further, the processing of the first significant control stage is repeatedly executed every time the processing related to the first significant engine control is performed, whereas the processing of the second significant control stage is repeatedly executed every time the processing related to the second significant engine control is performed.

Next, description is given of the processing of from the processing 151 to the processing 156 performed by the engine control device 20.

In the processing 151, the data collection means 24 collects data necessary for calculating a control amount regarding the second significant engine control (data for second control), and then causes the storage means 23 to store the collected data in the storage area for data necessary for calculation 243.

In the processing 152, the data transmission/reception means 21 transmits, to the AT control device 40, the data necessary for calculating a control amount regarding the second significant engine control.

In the processing 153, the control amount calculation means 25 calculates the control amount regarding the second significant engine control based on the data necessary for calculating the control amount regarding the second significant engine control and the control amount calculating procedure for second significant engine control 235, which are stored in the storage means 23.

In the processing 154, the data transmission/reception means 21 receives the control amount regarding the second significant engine control, which is transmitted from the AT control device 40.

In the processing 155, the comparison means 26 compares the control amount regarding the second significant engine control, which is calculated in the processing 153, and the control amount regarding the second significant engine control, which is received in the processing 154. Then, when the two control amounts have the same value, the comparison means 26 outputs the control amount regarding the second significant engine control to the engine control means 27. When the two control amounts have different values, the comparison means 26 outputs to the engine control means 27 a notification indicating that the control amounts are different.

In the processing 156, the engine control means 27 executes the control of the engine unit 200 based on a result of the comparison made by the comparison means 26. Specifically, when the control amount regarding the second significant engine control has been input from the comparison means 26, the engine control means 27 executes the control of the engine unit 200 based on this control amount. When the notification indicating that the control amounts are different has been input from the comparison means 26, the engine control means 27 does not execute the control of the engine unit 200.

Next, description is given of the processing of from the processing 161 to the processing 163 performed by the AT control device 40.

In the processing 161, the data transmission/reception means 41 receives the data necessary for calculating the control amount regarding the second significant engine control, which is transmitted from the engine control device 20. Then, the data saving means 44 causes the storage means 43 to store the received data in the storage area for data necessary for calculation 443.

In the processing 162, the control amount calculation means 45 calculates the control amount regarding the second significant engine control based on the data necessary for calculating the control amount regarding the second significant engine control and the control amount calculating procedure for second significant engine control 235, which are stored in the storage means 43.

In the processing 163, the data transmission/reception means 41 transmits, to the engine control device 20, the control amount regarding the second significant engine control, which is calculated in the processing 162.

It should be noted that, in the engine control device 20, after the processing 111, the engine control device time and the network time are identical due to the synchronization. Further, in the meter control device 30, after the processing 121, the meter control device time and the network time are identical due to the synchronization. Further, in the AT control device 40, after the processing 131, the AT control device time and the network time are identical due to the synchronization.

In the timing chart illustrated in FIG. 15, only the processing related to the first significant engine control and the processing related to the second significant engine control are illustrated for the purpose of clarifying the features of the fifth embodiment. However, in actuality, not only these processings, there exist processing related to the normal engine control, processing related to the meter control and processing related to the AT control in the engine control device 20, in the meter control device 30, and in the AT control device 40, respectively. These processings are executed in each of the control devices during the free time in which the processing related to the first significant engine control (processing of the first significant control stage and processing of the second significant control stage illustrated in FIG. 15) is not executed.

Next, referring to the timing chart of FIG. 15, description is given of operation of the control system, which is performed in a case where there is no abnormality in the control amount calculation means 25, the control amount calculation means 35, and the control amount calculation means 45, enabling the control amount regarding the first significant engine control and the control amount regarding the second significant engine control to be calculated accurately.

First, description is given of the processing of the synchronization stage.

First, the engine control device 20 is booted by a time point t141, and, at the time point t141, the time synchronization means 28 executes the processing 111. In the engine control device 20, after a time point t142, at which the processing 111 ends, the engine control device time and the network time are identical due to the synchronization.

Next, the meter control device 30 is booted by a time point t143, and, at the time point t143, the time synchronization means 38 executes the processing 121. In the meter control device 30, after a time point t144, at which the processing 121 ends, the meter control device time and the network time are identical due to the synchronization.

Next, the AT control device 40 is booted by a time point t145, and, at the time point t145, the time synchronization means 47 executes the processing 131. In the AT control device 40, after a time point t146, at which the processing 131 ends, the AT control device time and the network time are identical due to the synchronization.

Next, description is given of the processing of the first significant control stage.

First, at a time point t147, the data collection means 24 executes the processing 112 to cause the storage means 23 to store the data necessary for calculating the control amount regarding the first significant engine control in the storage area for data necessary for calculation 243.

Next, at a time point t148, the data transmission/reception means 21 executes the processing 113 to transmit, via the network 10, the data necessary for calculating the control amount regarding the first significant engine control to the meter control device 30.

Next, at a time point t149, the data transmission/reception means 31 and the data saving means 34 execute the processing 122 to cause the storage means 33 to store the received data necessary for calculating the control amount regarding the first significant engine control in the storage area for data necessary for calculation 343.

Next, at a time point t150, the control amount calculation means 25 and the control amount calculation means 35 simultaneously execute the processing 114 and the processing 123, respectively. The control amount calculation means 25 and the control amount calculation means 35 calculate control amounts regarding the first significant engine control based on the data necessary for calculating the control amount regarding the first significant engine control and the control amount calculating procedure for first significant engine control 232, which are stored in the storage means 23 and the storage means 33, respectively.

Next, at a time point t151, the data transmission/reception means 31 executes the processing 124 to transmit the control amount regarding the first significant engine control, which is calculated in the processing 123, to the engine control device 20 via the network 10.

Next, at a time point t152, the data transmission/reception means 21 executes the processing 115 to receive the control amount regarding the first significant engine control, which is transmitted via the network 10 from the meter control device 30.

Next, at a time point t153, the comparison means 26 executes the processing 116 to compare the control amount regarding the first significant engine control, which is calculated in the processing 114, and the control amount regarding the first significant engine control, which is received in the processing 115. Here, because there is no abnormality in both of the control amount calculation means 25 and the control amount calculation means 35, the control amounts regarding the first significant engine control have the same value. Accordingly, the comparison means 26 outputs the control amount regarding the first significant engine control to the engine control means 27.

Next, at a time point t154, the engine control means 27 executes the processing 117 to execute the control of the engine unit 200 based on the control amount regarding the first significant engine control, which has been input from the comparison means 26.

Next, description is given of the processing of the second significant control stage.

First, at a time point t155, the data collection means 24 executes the processing 151 to cause the storage means 23 to store the data necessary for calculating the control amount regarding the second significant engine control in the storage area for data necessary for calculation 243.

Next, at a time point t156, the data transmission/reception means 21 executes the processing 152 to transmit, via the network 10, the data necessary for calculating the control amount regarding the second significant engine control to the AT control device 40.

Next, at a time point t157, the data transmission/reception means 41 and the data saving means 44 execute the processing 161 to cause the storage means 43 to store, in the storage area for data necessary for calculation 443, the received data necessary for calculating the control amount regarding the second significant engine control.

Next, at a time point t158, the control amount calculation means 25 and the control amount calculation means 45 simultaneously execute the processing 153 and the processing 162, respectively. The control amount calculation means 25 and the control amount calculation means 45 calculate control amounts regarding the second significant engine control based on the data necessary for calculating the control amount regarding the second significant engine control and the control amount calculating procedure for second significant engine control 235, which are stored in the storage means 23 and the storage means 43, respectively.

Next, at a time point t159, the data transmission/reception means 41 executes the processing 163 to transmit the control amount regarding the second significant engine control, which is calculated in the processing 162, to the engine control device 20 via the network 10.

Next, at a time point t160, the data transmission/reception means 21 executes the processing 154 to receive the control amount regarding the second significant engine control, which is transmitted via the network 10 from the AT control device 40.

Next, at a time point t161, the comparison means 26 executes the processing 155 to compare the control amount regarding the second significant engine control, which is calculated in the processing 153, and the control amount regarding the second significant engine control, which is received in the processing 154. Here, because there is no abnormality in both of the control amount calculation means 25 and the control amount calculation means 45, the control amounts regarding the second significant engine control have the same value. Accordingly, the comparison means 26 outputs the control amount regarding the second significant engine control to the engine control means 27.

Next, at a time point t162, the engine control means 27 executes the processing 156 to execute the control of the engine unit 200 based on the control amount regarding the second significant engine control, which has been input from the comparison means 26.

Next, with reference to the timing chart of FIG. 15, description is given of operation of the control system, which is performed in a case where there is an abnormality in any one of the control amount calculation means 25, the control amount calculation means 35, and the control amount calculation means 45. Here, the description is given by taking as an example a case where, due to an abnormality in the control amount calculation means 25, only the control amount regarding the second significant engine control cannot be calculated accurately while the control amount regarding the first significant engine control can be calculated accurately.

It should be noted that because the processing of the synchronization stage, the processing of the first significant control stage, and the processing from the time point t155 to the time point t157 of the second significant control stage are the same as the above-mentioned processing performed in the case where there is no abnormality in the control amount calculation means 25, the control amount calculation means 35, and the control amount calculation means 45, description thereof is omitted.

First, at the time point t158, the control amount calculation means 25 and the control amount calculation means 45 simultaneously execute the processing 153 and the processing 162, respectively. The control amount calculation means 25 calculates the control amount regarding the second significant engine control based on the data necessary for calculating the control amount regarding the second significant engine control and the control amount calculating procedure for second significant engine control 235, which are stored in the storage means 23. Here, because, due to an abnormality in the control amount calculation means 25, only the control amount regarding the second significant engine control cannot be calculated accurately, the calculated control amount regarding the second significant engine control has a different value from the control amount that is to be obtained originally.

Further, the control amount calculation means 45 calculates the control amount regarding the second significant engine control based on the data necessary for calculating the control amount regarding the second significant engine control and the control amount calculating procedure for second significant engine control 235, which are stored in the storage means 43.

It should be noted that the processing from the time point t159 to the time point t160 of the second significant control stage is also the same as the above-mentioned processing performed in the case where there is no abnormality in the control amount calculation means 25, the control amount calculation means 35, and the control amount calculation means 45, and hence description thereof is omitted.

Next, at the time point t161, the comparison means 26 executes the processing 155 to compare the control amount regarding the second significant engine control, which is calculated in the processing 153, and the control amount regarding the second significant engine control, which is received in the processing 154. Here, because there is an abnormality in the control amount calculation means 25, the control amounts regarding the second significant engine control have different values. Accordingly, the comparison means 26 outputs to the engine control means 27 the notification indicating that the control amounts are different.

Next, at the time point t162, the engine control means 27 executes the processing 156. However, due to input of the notification indicating that the control amounts are different from the comparison means 26, the engine control means 27 does not execute the control of the engine unit 200.

In this manner, by comparing the control amount regarding the first significant engine control, which is calculated by the control amount calculation means 25, and the control amount regarding the first significant engine control, which is calculated by the control amount calculation means 35, and comparing and examining the control amount regarding the second significant engine control, which is calculated by the control amount calculation means 25, and the control amount regarding the second significant engine control, which is calculated by the control amount calculation means 45, it is possible to detect whether or not there is an abnormality in any one of the control amount calculation means 25, the control amount calculation means 35, and the control amount calculation means 45.

Specifically, by comparing the control amount regarding the first significant engine control, which is calculated by the control amount calculation means 25, and the control amount regarding the first significant engine control, which is calculated by the control amount calculation means 35, and comparing the control amount regarding the second significant engine control, which is calculated by the control amount calculation means 25, and the control amount regarding the second significant engine control, which is calculated by the control amount calculation means 45, and, when the respective pairs of the control amounts have the same values, executing the control of the engine unit 200 based on the respective control amounts, and, when at least one pair of the control amounts has different values, avoiding executing the control of the engine unit 200 for both the significant controls, it is possible to reduce the cost of the control system while securing the reliability of the control without providing two microcomputers or a monitoring circuit within the engine control device 20.

Further, while the control amount regarding the first significant engine control or the control amount regarding the second significant engine control is being calculated in the engine control device 20 (original calculation), the corresponding control amounts are simultaneously calculated by the control amount calculation means 35 of the meter control device 30 and the control amount calculation means 45 of the AT control device 40, to thereby compare results of the calculations. Then, when at least one pair of the control amounts has the same value, the control of the engine unit 200 is executed only for the first significant engine control or the second significant engine control, for which the control amounts have the same value. As a result, at the time of carrying out not the calculation for the abnormality detection but the original calculation, it is possible to judge whether or not there is an abnormality, thereby securing the reliability of the control.

As described above, according to the fifth embodiment, there are provided a first control device, a second control device, and a third control device, which are connected to a network in which time synchronization is possible between nodes connected thereto. The first control device includes: first control amount calculation means for calculating a control amount regarding a first significant control and a control amount regarding a second significant control based on a first control amount calculating procedure for calculating the control amount regarding the first significant control, a second control amount calculating procedure for calculating the control amount regarding the second significant control, data for first control necessary for calculating the control amount regarding the first significant control for a control target of the first control device, and data for second control necessary for calculating the control amount regarding the second significant control for the control target of the first control device; comparison means for comparing the control amount regarding the first significant control, which is calculated by the first control amount calculation means, and the control amount regarding the first significant control, which is calculated by the second control device, and comparing the control amount regarding the second significant control, which is calculated by the first control amount calculation means, and the control amount regarding the second significant control, which is calculated by the third control device; and control means for controlling the control target based on results of the comparison made by the comparison means. The second control device includes second storage means for storing the first control amount calculating procedure and the data for first control, which is received from the first control device via the network, and second control amount calculation means for calculating the control amount regarding the first significant control based on the first control amount calculating procedure and the data for first control. The third control device includes third storage means for storing the second control amount calculating procedure and the data for second control, which is received from the first control device via the network, and third control amount calculation means for calculating the control amount regarding the second significant control based on the second control amount calculating procedure and the data for second control.

Therefore, without providing two microcomputers having the same functions or a monitoring circuit within the control device, by comparing the control amount regarding the first significant control, which is calculated by the first control amount calculation means, and the control amount regarding the first significant control, which is calculated by the second control device, and comparing and examining the control amount regarding the second significant control, which is calculated by the first control amount calculation means, and the control amount regarding the second significant control, which is calculated by the third control device, it is possible to obtain a control system capable of reducing the cost while securing the reliability of the control.

Further, when the comparison means judges that the compared control amounts regarding the first significant control and the compared control amounts regarding the second significant control have the same values, respectively, the control means controls the control target based on the control amounts regarding the first significant control having the same value and the control amounts regarding the second significant control having the same value. When the comparison means judges that at least one of a pair of the compared control amounts regarding the first significant control and a pair of the compared control amounts regarding the second significant control has different values, the control means does not control the control target. Further, when the comparison means judges that at least one of a pair of the compared control amounts regarding the first significant control and a pair of the compared control amounts regarding the second significant control has different values, the control device controls the control target only for the first significant control or the second significant control, for which the control amounts have the same value. Therefore, the reliability of the control can be improved.

Here, in the fifth embodiment described above, there has been given the description in which, when the notification indicating that the control amounts are different has been input from the comparison means 26, the engine control means 27 does not execute the control of the engine unit 200. However, the present invention is not limited thereto. When the notification indicating that the control amounts are different has been input from the comparison means 26, the engine control means 27 may execute the control of the engine unit 200 with regard to the significant control for which the control amounts are different or with regard to both the significant controls, based on predetermined control amounts previously set as a control amount regarding the first significant engine control and a control amount regarding the second significant engine control, respectively. Further, instead of the predetermined control amounts, the engine control means 27 may use the control amount calculated last time.

In this case, even if an abnormality has occurred in any one of the control amount calculation means 25, the control amount calculation means 35, and the control amount calculation means 45, it is possible to continue the control without stopping the engine.

Further, in the fifth embodiment described above, the control amount calculation means 25, the control amount calculation means 35, and the control amount calculation means 45 may have an identical configuration by, for example, using microcomputers of the same model number from the same manufacturer.

In this case, the control amounts can be calculated more accurately. In addition, by executing the control of the engine unit 200 based on results obtained through comparison among such control amounts, it is possible to improve the reliability of the control.

Further, in the fifth embodiment described above, the storage means 23, the storage means 33, and the storage means 43 may have an identical configuration by, for example, using memories of the same model number from the same manufacturer. Then, the control amount calculating procedure for first significant engine control 232 may be stored at the same location of each of the storage means 23 and the storage means 33. The control amount calculating procedure for second significant engine control 235 may be stored at the same location of each of the storage means 23 and the storage means 43.

In this case, the control amounts can be calculated more accurately. In addition, by executing the control of the engine unit 200 based on results obtained through comparison among such control amounts, it is possible to improve the reliability of the control.

Further, in the fifth embodiment described above, the storage means 23, the storage means 33, and the storage means 43 may have an identical configuration by, for example, using memories of the same model number from the same manufacturer. Then, the storage area for data necessary for calculation 243 and the storage area for data necessary for calculation 343, in which data necessary for calculating a control amount regarding the first significant engine control is stored, may be located at the same location of each of the storage means 23 and the storage means 33. The storage area for data necessary for calculation 243 and the storage area for data necessary for calculation 443, in which data necessary for calculating a control amount regarding the second significant engine control is stored, may be located at the same location of each of the storage means 23 and the storage means 43.

In this case, the control amounts can be calculated more accurately. In addition, by executing the control of the engine unit 200 based on results obtained through comparison among such control amounts, it is possible to improve the reliability of the control.

Further, in the fifth embodiment described above, there has been given the description of the case where an abnormality occurs in the control amount calculation means 25. According to the fifth embodiment, even if unintended data change, data corruption, or the like has occurred after the data necessary for calculating a control amount regarding the first significant engine control is transmitted to the meter control device 30 by the data transmission/reception means 21 or after the data necessary for calculating a control amount regarding the second significant engine control is transmitted to the AT control device 40 by the data transmission/reception means 21, it is possible to improve the reliability of the control by executing the control of the engine unit 200 based on results obtained through comparison among the calculated control amounts.

Further, in the fourth and fifth embodiment described above, there has been given the description by taking as an example the case where three control devices are used, but the present invention is not limited thereto. Even if four or more control devices are used, the same effect can be obtained.

Further, in the third to fifth embodiments described above, the storage means and the control amount calculation means are described as being separate components, but the present invention is not limited thereto. Even if a storage area is provided inside the control amount calculation means, the same effect can be obtained.

What is claimed is:

1. A control system comprising a plurality of control devices for controlling different control targets, respectively, the plurality of control devices each being connected to a network in which availability of transmission is determined based on a communication status at a time of the transmission, the plurality of control devices comprising a first control device and a second control device and subsequent control devices, wherein:
   the first control device and at least one of the second control device and the subsequent control devices each store a control amount calculating procedure for calculating a control amount regarding a significant control having a higher degree of significance among controls to be performed on the control target of the first control device;
   the first control device compares a control amount regarding the significant control, which is calculated by the first control device, and a control amount regarding the significant control, which is calculated by the at least one of the second control device and the subsequent control devices, to thereby control the control target of the first control device based on a result of the comparison; and
   when data regarding the significant control is transmitted and received between the first control device and the at least one of the second control device and the subsequent control devices, a control device that is to transmit the data regarding the significant control transmits the data regarding the significant control after suspending the transmission of data from other control devices;
   wherein, when the data regarding the significant control is transmitted and received between the first control device and the at least one of the second control device and the subsequent control devices, a control device that is to receive the data regarding the significant control cancels the suspending of the transmission of the data from the other control devices after reception of the data regarding the significant control;

wherein:
the plurality of control devices comprise the first control device and a second control device, which are connected to the network;
the first control device comprises:
   a first instruction means for transmission suspension/suspension cancellation for transmitting, to the other control devices connected to the network, one of an instruction to suspend the transmission of the data and an instruction to cancel the suspending of the transmission of the data;
   a first storage means for storing a first control amount calculating procedure for calculating a control amount regarding a first significant control for the control target of the first control device and data for first control necessary for calculating the control amount regarding the first significant control;
   data collection means for collecting the data for first control to store the data for first control in the first storage means;
   a first control amount calculation means for calculating the control amount regarding the first significant control based on the first control amount calculating procedure and the data for first control, which are stored in the first storage means;
   comparison means for comparing the control amount regarding the first significant control, which is calculated by the first control amount calculation means, and a control amount regarding the first significant control, which is calculated by the second control device; and
   control means for controlling the control target based on a result of the comparison made by the comparison means; and
the second control device comprises:
   a second instruction means for transmission suspension/suspension cancellation for transmitting, to the other control devices connected to the network, one of the instruction to suspend the transmission of the data and the instruction to cancel the suspending of the transmission of the data;
   a second storage means for storing the first control amount calculating procedure and the data for first control;
   a second saving means for causing the second storage means to store the data for first control, which is received from the first control device via the network; and
   a second control amount calculation means for calculating the control amount regarding the first significant control based on the first control amount calculating procedure and the data for first control, which are stored in the second storage means.

2. A control system comprising a plurality of control devices for controlling different control targets, respectively, the plurality of control devices each being connected to a network in which availability of transmission is determined based on a communication status at a time of the transmission, the plurality of control devices comprising a first control device and a second control device and subsequent control devices, wherein:
   the first control device and at least one of the second control device and the subsequent control devices each store a control amount calculating procedure for calculating a control amount regarding a significant control having a higher degree of significance among controls to be performed on the control target of the first control device;

the first control device compares a control amount regarding the significant control, which is calculated by the first control device, and a control amount regarding the significant control, which is calculated by the at least one of the second control device and the subsequent control devices, to thereby control the control target of the first control device based on a result of the comparison; and when data regarding the significant control is transmitted and received between the first control device and the at least one of the second control device and the subsequent control devices, a control device that is to transmit the data regarding the significant control transmits the data regarding the significant control after suspending the transmission of data from other control devices;

wherein, when the data regarding the significant control is transmitted and received between the first control device and the at least one of the second control device and the subsequent control devices, a control device that is to receive the data regarding the significant control cancels the suspending of the transmission of the data from the other control devices after reception of the data regarding the significant control;

wherein:

the plurality of control devices comprise the first control device, a second control device, and a third control device, which are connected to the network;

the first control device comprises:
  a first instruction means for transmission suspension/ suspension cancellation for transmitting, to the other control devices connected to the network, one of an instruction to suspend the transmission of the data and an instruction to cancel the suspending of the transmission of the data;
  a first storage means for storing a first control amount calculating procedure for calculating a control amount regarding a first significant control for the control target of the first control device, a second control amount calculating procedure for calculating a control amount regarding a second significant control for the control target of the first control device, data for first control necessary for calculating the control amount regarding the first significant control, and data for second control necessary for calculating the control amount regarding the second significant control;
  data collection means for collecting the data for first control and the data for second control to store the data for first control and the data for second control in the first storage means;
  a first control amount calculation means for calculating the control amount regarding the first significant control based on the first control amount calculating procedure and the data for first control, and calculating the control amount regarding the second significant control based on the second control amount calculating procedure and the data for second control, the first control amount calculating procedure, the data for first control, the second control amount calculating procedure, and the data for second control being stored in the first storage means;
  comparison means for comparing the control amount regarding the first significant control, which is calculated by the first control amount calculation means, and a control amount regarding the first significant control, which is calculated by the second control device, and comparing the control amount regarding the second significant control, which is calculated by the first control amount calculation means, and a control amount regarding the second significant control, which is calculated by the third control device; and
  control means for controlling the control target based on results of the comparison made by the comparison means;

the second control device comprises:
  a second instruction means for transmission suspension/ suspension cancellation for transmitting, to the other control devices connected to the network, one of the instruction to suspend the transmission of the data and the instruction to cancel the suspending of the transmission of the data;
  a second storage means for storing the first control amount calculating procedure and the data for first control;
  a second saving means for causing the second storage means to store the data for first control, which is received from the first control device via the network; and
  a second control amount calculation means for calculating the control amount regarding the first significant control based on the first control amount calculating procedure and the data for first control, which are stored in the second storage means; and the third control device comprises:
  a third instruction means for transmission suspension/ suspension cancellation for transmitting, to the other control devices connected to the network, one of the instruction to suspend the transmission of the data and the instruction to cancel the suspending of the transmission of the data;
  a third storage means for storing the second control amount calculating procedure and the data for second control;
  a third saving means for causing the third storage means to store the data for second control, which is received from the first control device via the network; and
  a third control amount calculation means for calculating the control amount regarding the second significant control based on the second control amount calculating procedure and the data for second control, which are stored in the third storage means.

3. A control system comprising a plurality of control devices for controlling different control targets, respectively, the plurality of control devices each being connected to a network in which availability of transmission is determined based on a communication status at a time of the transmission, the plurality of control devices comprising a first control device and a second control device and subsequent control devices, wherein:

the first control device and at least one of the second control device and the subsequent control devices each store a control amount calculating procedure for calculating a control amount regarding a significant control having a higher degree of significance among controls to be performed on the control target of the first control device;

the first control device compares a control amount regarding the significant control, which is calculated by the first control device, and a control amount regarding the significant control, which is calculated by the at least one of the second control device and the subsequent control devices, to thereby control the control target of the first control device based on a result of the comparison; and when data regarding the significant control is transmitted and received between the first control device and the at least one of the second control device and the subsequent control devices, a control device that is to transmit the data regarding the significant control transmits the data regarding the significant control after suspending the transmission of data from other control devices;

wherein, when the data regarding the significant control is transmitted and received between the first control device and the at least one of the second control device and the subsequent control devices, the control device that is to transmit the data regarding the significant control cancels the suspending of the transmission of the data from the other control devices when a predetermined period of time has elapsed after the transmission of the data regarding the significant control;

wherein:

the plurality of control devices comprise the first control device and a second control device, which are connected to the network;

the first control device comprises:
- a first instruction means for transmission suspension/suspension cancellation for transmitting, to the other control devices connected to the network, one of an instruction to suspend the transmission of the data and an instruction to cancel the suspending of the transmission of the data;
- a first storage means for storing a first control amount calculating procedure for calculating a control amount regarding a first significant control for the control target of the first control device and data for first control necessary for calculating the control amount regarding the first significant control;
- data collection means for collecting the data for first control to store the data for first control in the first storage means;
- a first control amount calculation means for calculating the control amount regarding the first significant control based on the first control amount calculating procedure and the data for first control, which are stored in the first storage means;
- comparison means for comparing the control amount regarding the first significant control, which is calculated by the first control amount calculation means, and a control amount regarding the first significant control, which is calculated by the second control device; and
- control means for controlling the control target based on a result of the comparison made by the comparison means; and the second control device comprises:
- a second instruction means for transmission suspension/suspension cancellation for transmitting, to the other control devices connected to the network, one of the instruction to suspend the transmission of the data and the instruction to cancel the suspending of the transmission of the data;
- a second storage means for storing the first control amount calculating procedure and the data for first control;
- a second saving means for causing the second storage means to store the data for first control, which is received from the first control device via the network; and
- a second control amount calculation means for calculating the control amount regarding the first significant control based on the first control amount calculating procedure and the data for first control, which are stored in the second storage means.

4. A control system comprising a plurality of control devices for controlling different control targets, respectively, the plurality of control devices each being connected to a network in which availability of transmission is determined based on a communication status at a time of the transmission, the plurality of control devices comprising a first control device and a second control device and subsequent control devices, wherein:

the first control device and at least one of the second control device and the subsequent control devices each store a control amount calculating procedure for calculating a control amount regarding a significant control having a higher degree of significance among controls to be performed on the control target of the first control device;

the first control device compares a control amount regarding the significant control, which is calculated by the first control device, and a control amount regarding the significant control, which is calculated by the at least one of the second control device and the subsequent control devices, to thereby control the control target of the first control device based on a result of the comparison; and when data regarding the significant control is transmitted and received between the first control device and the at least one of the second control device and the subsequent control devices, a control device that is to transmit the data regarding the significant control transmits the data regarding the significant control after suspending the transmission of data from other control devices;

wherein, when the data regarding the significant control is transmitted and received between the first control device and the at least one of the second control device and the subsequent control devices, the control device that is to transmit the data regarding the significant control cancels the suspending of the transmission of the data from the other control devices when a predetermined period of time has elapsed after the transmission of the data regarding the significant control;

wherein:

the plurality of control devices comprise the first control device, a second control device, and a third control device, which are connected to the network;

the first control device comprises:
- a first instruction means for transmission suspension/suspension cancellation for transmitting, to the other control devices connected to the network, one of an instruction to suspend the transmission of the data and an instruction to cancel the suspending of the transmission of the data;
- a first storage means for storing a first control amount calculating procedure for calculating a control amount regarding a first significant control for the control target of the first control device, a second control amount calculating procedure for calculating a control amount regarding a second significant control for the control target of the first control device, data for first control necessary for calculating the control amount regarding the first significant control, and data for second control necessary for calculating the control amount regarding the second significant control;
- data collection means for collecting the data for first control and the data for second control to store the data for first control and the data for second control in the first storage means;
- a first control amount calculation means for calculating the control amount regarding the first significant control based on the first control amount calculating procedure and the data for first control, and calculating the control amount regarding the second significant control based on the second control amount calculating procedure and the data for second control, the first control amount calculating procedure, the data for first control, the second control amount calculating procedure, and the data for second control being stored in the first storage means;

comparison means for comparing the control amount regarding the first significant control, which is calculated by the first control amount calculation means, and a control amount regarding the first significant control, which is calculated by the second control device, and comparing the control amount regarding the second significant control, which is calculated by the first control amount calculation means, and a control amount regarding the second significant control, which is calculated by the third control device; and control means for controlling the control target based on results of the comparison made by the comparison means;

the second control device comprises:
  a second instruction means for transmission suspension/suspension cancellation for transmitting, to the other control devices connected to the network, one of the instruction to suspend the transmission of the data and the instruction to cancel the suspending of the transmission of the data;
  a second storage means for storing the first control amount calculating procedure and the data for first control;
  a second saving means for causing the second storage means to store the data for first control, which is received from the first control device via the network; and
  a second control amount calculation means for calculating the control amount regarding the first significant control based on the first control amount calculating procedure and the data for first control, which are stored in the second storage means; and the third control device comprises:
  a third instruction means for transmission suspension/suspension cancellation for transmitting, to the other control devices connected to the network, one of the instruction to suspend the transmission of the data and the instruction to cancel the suspending of the transmission of the data;
  a third storage means for storing the second control amount calculating procedure and the data for second control;
  a third saving means for causing the third storage means to store the data for second control, which is received from the first control device via the network; and
  a third control amount calculation means for calculating the control amount regarding the second significant control based on the second control amount calculating procedure and the data for second control, which are stored in the third storage means.

5. A control system according to claim 1, wherein, after the second control device receives the data for first control from the first control device via the network, the first control amount calculation means and the second control amount calculation means calculate the control amounts regarding the first significant control in synchronization with each other in response to the instruction to cancel the suspending of the transmission of the data, which is transmitted from one of the first instruction means for transmission suspension/suspension cancellation and the second instruction means for transmission suspension/suspension cancellation.

6. A control system according to claim 2, wherein, after the second control device receives the data for first control from the first control device via the network, the first control amount calculation means and the second control amount calculation means calculate the control amounts regarding the first significant control in synchronization with each other in response to the instruction to cancel the suspending of the transmission of the data, which is transmitted from one of the first instruction means for transmission suspension/suspension cancellation and the second instruction means for transmission suspension/suspension cancellation.

7. A control system according to claim 3, wherein, after the second control device receives the data for first control from the first control device via the network, the first control amount calculation means and the second control amount calculation means calculate the control amounts regarding the first significant control in synchronization with each other in response to the instruction to cancel the suspending of the transmission of the data, which is transmitted from one of the first instruction means for transmission suspension/suspension cancellation and the second instruction means for transmission suspension/suspension cancellation.

8. A control system according to claim 4, wherein, after the second control device receives the data for first control from the first control device via the network, the first control amount calculation means and the second control amount calculation means calculate the control amounts regarding the first significant control in synchronization with each other in response to the instruction to cancel the suspending of the transmission of the data, which is transmitted from one of the first instruction means for transmission suspension/suspension cancellation and the second instruction means for transmission suspension/suspension cancellation.

9. A control system according to claim 2, wherein, after the third control device receives the data for second control from the first control device via the network, the first control amount calculation means and the third control amount calculation means calculate the control amounts regarding the second significant control in synchronization with each other in response to the instruction to cancel the suspending of the transmission of the data, which is transmitted from one of the first instruction means for transmission suspension/suspension cancellation and the third instruction means for transmission suspension/suspension cancellation.

10. A control system according to claim 1, wherein, when the comparison means judges that all of the compared control amounts regarding the first significant control have the same value, the control means controls the control target based on the control amounts regarding the first significant control having the same value.

11. A control system according to claim 1, wherein, when the comparison means judges that not all of the compared control amounts regarding the first significant control have the same value, the control means avoids controlling the control target.

12. A control system according to claim 1, wherein, when the comparison means judges that not all of the compared control amounts regarding the first significant control have the same value, the control means controls the control target based on a predetermined control amount previously set as a control amount regarding the first significant control.

13. A control system according to claim 2, wherein, when the comparison means judges that the compared control amounts regarding the first significant control have the same value, and that the compared control amounts regarding the second significant control have the same value, the control means controls the control target based on one of the control amounts regarding the first significant control having the same value and the control amounts regarding the second significant control having the same value.

14. A control system according to claim 2, wherein, when the comparison means judges that at least one of a pair of the compared control amounts regarding the first significant control and a pair of the compared control amounts regarding the second significant control has different values, the control means avoids executing the first significant control and the second significant control with respect to the control target.

15. A control system according to claim 2, wherein, when the comparison means judges that at least one of a pair of the compared control amounts regarding the first significant control and a pair of the compared control amounts regarding the second significant control has different values, the control means controls the control target based on a predetermined control amount previously set, only with regard to a significant control for which the control amounts have the different values.

16. A control system according to claim 2, wherein, when the comparison means judges that at least one of a pair of the compared control amounts regarding the first significant control and a pair of the compared control amounts regarding the second significant control has different values, the control means controls the control target based on predetermined control amounts previously set as a control amount regarding the first significant control and a control amount regarding the second significant control, respectively.

17. A control system according to claim 1, wherein the first control amount calculation means and the second control amount calculation means each comprise a microcomputer of the same configuration.

18. A control system according to claim 2, wherein the first control amount calculation means, the second control amount calculation means, and the third control amount calculation means each comprise a microcomputer of the same configuration.

19. A control system according to claim 1, wherein:
the first storage means and the second storage means each comprise a memory of the same configuration; and
the first control amount calculating procedure and the data for first control are stored at the same location of each of the first storage means and the second storage means.

20. A control system according to claim 2, wherein:
the first storage means, the second storage means, and the third storage means each comprise a memory of the same configuration;
the first control amount calculating procedure and the data for first control are stored at the same location of each of the first storage means and the second storage means; and
the second control amount calculating procedure and the data for second control are stored at the same location of each of the first storage means and the third storage means.

21. A control system according to claim 4, wherein, after the third control device receives the data for second control from the first control device via the network, the first control amount calculation means and the third control amount calculation means calculate the control amounts regarding the second significant control in synchronization with each other in response to the instruction to cancel the suspending of the transmission of the data, which is transmitted from one of the first instruction means for transmission suspension/suspension cancellation and the third instruction means for transmission suspension/suspension cancellation.

22. A control system according to claim 3, wherein, when the comparison means judges that all of the compared control amounts regarding the first significant control have the same value, the control means controls the control target based on the control amounts regarding the first significant control having the same value.

23. A control system according to claim 3, wherein, when the comparison means judges that not all of the compared control amounts regarding the first significant control have the same value, the control means avoids controlling the control target.

24. A control system according to claim 3, wherein, when the comparison means judges that not all of the compared control amounts regarding the first significant control have the same value, the control means controls the control target based on a predetermined control amount previously set as a control amount regarding the first significant control.

25. A control system according to claim 4, wherein, when the comparison means judges that the compared control amounts regarding the first significant control have the same value, and that the compared control amounts regarding the second significant control have the same value, the control means controls the control target based on one of the control amounts regarding the first significant control having the same value and the control amounts regarding the second significant control having the same value.

26. A control system according to claim 4, wherein, when the comparison means judges that at least one of a pair of the compared control amounts regarding the first significant control and a pair of the compared control amounts regarding the second significant control has different values, the control means avoids executing the first significant control and the second significant control with respect to the control target.

27. A control system according to claim 4, wherein, when the comparison means judges that at least one of a pair of the compared control amounts regarding the first significant control and a pair of the compared control amounts regarding the second significant control has different values, the control means controls the control target based on a predetermined control amount previously set, only with regard to a significant control for which the control amounts have the different values.

28. A control system according to claim 4, wherein, when the comparison means judges that at least one of a pair of the compared control amounts regarding the first significant control and a pair of the compared control amounts regarding the second significant control has different values, the control means controls the control target based on predetermined control amounts previously set as a control amount regarding the first significant control and a control amount regarding the second significant control, respectively.

29. A control system according to claim 3, wherein the first control amount calculation means and the second control amount calculation means each comprise a microcomputer of the same configuration.

30. A control system according to claim 4, wherein the first control amount calculation means, the second control amount calculation means, and the third control amount calculation means each comprise a microcomputer of the same configuration.

31. A control system according to claim 3, wherein:
the first storage means and the second storage means each comprise a memory of the same configuration; and
the first control amount calculating procedure and the data for first control are stored at the same location of each of the first storage means and the second storage means.

32. A control system according to claim 4, wherein:
the first storage means, the second storage means, and the third storage means each comprise a memory of the same configuration;
the first control amount calculating procedure and the data for first control are stored at the same location of each of the first storage means and the second storage means; and
the second control amount calculating procedure and the data for second control are stored at the same location of each of the first storage means and the third storage means.

\* \* \* \* \*